(12) United States Patent
Sinyavskiy et al.

(10) Patent No.: US 9,256,823 B2
(45) Date of Patent: Feb. 9, 2016

(54) APPARATUS AND METHODS FOR EFFICIENT UPDATES IN SPIKING NEURON NETWORK

(75) Inventors: Oleg Sinyavskiy, San Diego, CA (US); Vadim Polonichko, San Diego, CA (US); Eugene Izhikevich, San Diego, CA (US); Jeffrey Alexander Levin, San Diego, CA (US)

(73) Assignee: QUALCOMM TECHNOLOGIES INC., San Diego, CA (US)

( * ) Notice: Subject to any disclaimer, the term of this patent is extended or adjusted under 35 U.S.C. 154(b) by 531 days.

(21) Appl. No.: 13/560,891

(22) Filed: Jul. 27, 2012

(65) Prior Publication Data

US 2014/0032458 A1 Jan. 30, 2014

(51) Int. Cl.
- *G06N 5/00* (2006.01)
- *G06F 1/00* (2006.01)
- *G06N 3/04* (2006.01)

(52) U.S. Cl.
CPC ..................................... *G06N 3/049* (2013.01)

(58) Field of Classification Search
CPC ........... G06N 3/08; G06N 3/02; G06N 3/049; G06N 3/04; G06N 3/063
See application file for complete search history.

(56) References Cited

U.S. PATENT DOCUMENTS

| | | | |
|---|---|---|---|
| 5,063,603 A | 11/1991 | Burt | |
| 5,253,330 A * | 10/1993 | Ramacher et al. | 706/42 |
| 5,355,435 A | 10/1994 | DeYong | |
| 5,638,359 A | 6/1997 | Peltola | |
| 5,673,367 A | 9/1997 | Buckley | |
| 5,875,108 A | 2/1999 | Hoffberg | |

(Continued)

FOREIGN PATENT DOCUMENTS

| | | |
|---|---|---|
| CN | 102226740 | 10/2011 |
| JP | 4087423 | 3/1992 |

(Continued)

OTHER PUBLICATIONS

Gluck, Stimulus Generalization and Representation in Adaptive Network Models of Category Learning [online], 1991 [retrieved on Aug. 24, 2013]. Retrieved from the Internet: <URL:http://www.google.com/url?sa=t&rct=j&q=Gluck+%22STIMULUS+GENERALIZATION+AND+REPRESENTATION N+IN+ADAPTIVE+NETWORK+MODELS+OF+CATEGORY+LEARNING%22.

(Continued)

*Primary Examiner* — Jeffrey A Gaffin
*Assistant Examiner* — Kalpana Bharadwaj
(74) *Attorney, Agent, or Firm* — Seyfarth Shaw LLP

(57) ABSTRACT

Efficient updates of connections in artificial neuron networks may be implemented. A framework may be used to describe the connections using a linear synaptic dynamic process, characterized by stable equilibrium. The state of neurons and synapses within the network may be updated, based on inputs and outputs to/from neurons. In some implementations, the updates may be implemented at regular time intervals. In one or more implementations, the updates may be implemented on-demand, based on the network activity (e.g., neuron output and/or input) so as to further reduce computational load associated with the synaptic updates. The connection updates may be decomposed into multiple event-dependent connection change components that may be used to describe connection plasticity change due to neuron input. Using event-dependent connection change components, connection updates may be executed on per neuron basis, as opposed to per-connection basis.

24 Claims, 17 Drawing Sheets

(56) References Cited

U.S. PATENT DOCUMENTS

| | | | |
|---|---|---|---|
| 6,009,418 | A | 12/1999 | Cooper |
| 6,014,653 | A | 1/2000 | Thaler |
| 6,458,157 | B1 | 10/2002 | Suaning |
| 6,545,705 | B1 | 4/2003 | Sigel |
| 6,545,708 | B1 | 4/2003 | Tamayama |
| 6,546,291 | B2 | 4/2003 | Merfeld |
| 6,581,046 | B1 | 6/2003 | Ahissar |
| 7,536,374 | B2 | 5/2009 | Au |
| 7,849,030 | B2 | 12/2010 | Ellingsworth |
| 8,015,130 | B2 | 9/2011 | Matsugu |
| 8,103,602 | B2 | 1/2012 | Izhikevich |
| 8,315,305 | B2 | 11/2012 | Petre |
| 8,467,623 | B2 | 6/2013 | Izhikevich |
| 2002/0038294 | A1 | 3/2002 | Matsugu |
| 2003/0050903 | A1 | 3/2003 | Liaw |
| 2004/0193670 | A1 | 9/2004 | Langan |
| 2005/0015351 | A1 | 1/2005 | Nugent |
| 2005/0036649 | A1 | 2/2005 | Yokono |
| 2005/0283450 | A1 | 12/2005 | Matsugu |
| 2006/0161218 | A1 | 7/2006 | Danilov |
| 2006/0224533 | A1 | 10/2006 | Thaler |
| 2007/0176643 | A1 | 8/2007 | Nugent |
| 2007/0208678 | A1 | 9/2007 | Matsugu |
| 2009/0043722 | A1 | 2/2009 | Nugent |
| 2009/0287624 | A1 | 11/2009 | Rouat |
| 2010/0086171 | A1 | 4/2010 | Lapstun |
| 2010/0166320 | A1 | 7/2010 | Paquier |
| 2010/0228393 | A1* | 9/2010 | Mersmann et al. ......... 700/246 |
| 2011/0016071 | A1 | 1/2011 | Guillen |
| 2011/0106741 | A1 | 5/2011 | Denneau |
| 2011/0119214 | A1 | 5/2011 | Breitwisch |
| 2011/0119215 | A1 | 5/2011 | Elmegreen |
| 2011/0160741 | A1 | 6/2011 | Asano |
| 2012/0011090 | A1 | 1/2012 | Tang |
| 2012/0109866 | A1 | 5/2012 | Modha |
| 2012/0303091 | A1 | 11/2012 | Izhikevich |
| 2012/0308076 | A1 | 12/2012 | Piekniewski |
| 2012/0308136 | A1 | 12/2012 | Izhikevich |
| 2013/0073484 | A1 | 3/2013 | Izhikevich |
| 2013/0073491 | A1 | 3/2013 | Izhikevich |
| 2013/0073492 | A1 | 3/2013 | Izhikevich |
| 2013/0073495 | A1 | 3/2013 | Izhikevich |
| 2013/0073496 | A1 | 3/2013 | Szatmary |
| 2013/0073498 | A1 | 3/2013 | Izhikevich |
| 2013/0073499 | A1* | 3/2013 | Izhikevich et al. ......... 706/27 |
| 2013/0073500 | A1 | 3/2013 | Szatmary |
| 2013/0151450 | A1 | 6/2013 | Ponulak |
| 2013/0218821 | A1 | 8/2013 | Szatmary |
| 2013/0251278 | A1 | 9/2013 | Izhikevich |
| 2013/0297539 | A1 | 11/2013 | Piekniewski |
| 2013/0297541 | A1 | 11/2013 | Piekniewski |
| 2013/0297542 | A1 | 11/2013 | Piekniewski |
| 2013/0325768 | A1 | 12/2013 | Sinyavskiy |
| 2013/0325773 | A1 | 12/2013 | Sinyavskiy |
| 2013/0325774 | A1 | 12/2013 | Sinyavskiy |
| 2013/0325775 | A1 | 12/2013 | Sinyavskiy |
| 2013/0325777 | A1 | 12/2013 | Petre |
| 2014/0032458 | A1 | 1/2014 | Sinyavskiy |
| 2014/0032459 | A1 | 1/2014 | Sinyavskiy |

FOREIGN PATENT DOCUMENTS

| | | |
|---|---|---|
| RU | 2108612 | 10/1998 |
| RU | 2406105 | 10/2010 |
| RU | 2424561 C2 | 7/2011 |
| WO | 2008132066 | 6/2008 |
| WO | 2008083335 | 7/2008 |

OTHER PUBLICATIONS

Fidjeland et al. 'Accelerated Simulation of Spiking Neural Networks Using GPUs' WCCI 2010 IEEE World Congress on Computational Intelligience, Jul. 18-23, 2010—CCIB, Barcelona, Spain, pp. 536-543, [retrieved on Nov. 14, 2012]. Retrieved from the Internet: <URL:http://www.doc.ic.ac.ukl-mpsha/IJCNN10b.pdf>.

PCT International Search Report and Written Opinion for Int'l application No. PCT/US2012/055933, dated Dec. 4, 2012.

PCT International Search Report for PCT/US2013/055381 dated Nov. 14, 2013.

PCT International Search Report for PCT/US2013/032546 dated Jul. 11, 2013.

Sjostrom et al., 'Spike-Timing Dependent Plasticity' Scholarpedia, 5(2):1362 (2010), pp. 1-18.

Graham "The Surf Hippo User Manual Version 3.0 B". Unite de Neurosiences Integratives et Computationnelles Institut Federatif de Neurobiologie Alfred Fessard, CNRS. France. Mar. 2002 [retrieved Jan. 16, 2014]. [retrieved biomedical.univ-paris5.fr].

Sinyavskiy O. Yu.: 'Obuchenic s podkrepleniem spaikovoy neiroiniy seti v zadache upravleniya agentom v diskretnoy virtualnoy srede.' Nelineinaya Dinamika vol. T. 7., No. 24, 2011, pp. 859-875.

Aleksandrov (1968), Stochastic optimization, Engineering Cybernetics, 5, 1116.

Baras et al., (2007), Reinforcement learning, spike-time-dependent plasticity, 25 and the BCM rule, Neural Comput 19, 22452279.

Bartlett et al., (2000), A biologically plausible and locally optimal learning algorithm for spiking neurons, Retrieved from http://arp.anu.edu.au/ftp/papers/jon/brains.pdf.gz.

Baxter et al., (2000), Direct gradient-based reinforcement learning, In Proceedings of the International Symposium on Circuits and Systems, (pp. III-271-274).

Bohte et al., (2000), SpikeProp: backpropagation for networks of spiking neurons, In Proceedings of ESANN'2000, (pp. 419-424).

Bohte (2005), A computational theory of spike-timing dependent plasticity: achieving robust neural responses via conditional entropy minimization, SEN-E0505.

Booij (2005), A Gradient Descent Rule for Spiking Neurons Emitting Multiple Spikes, Information Processing Letters n. 6, v.95, 552558.

El-Laithy (2011), A reinforcement learning framework for spiking networks with dynamic synapses, Comput Intell Neurosci.

Fletcher (1987), Practical methods of optimization, New York, NY: Wiley-Interscience.

Florian (2005), A reinforcement learning algorithm for spiking neural networks SYNASC '05 Proceedings of the Seventh International Symposium on Symbolic and Numeric Algorithms for Scientific Computing.

Fu (2008), What You Should Know About Simulation and Derivatives Naval Research Logistics, vol. 55, No. 8 , 723-736.

Gerstner (2002), Spiking neuron models: single neurons, populations, plasticity, Cambridge, U.K.: Cambridge University Press.

Fu et al, (1995), "Likelihood ratio gradient estimation for regenerative stochastic recursion", Advances in Applied Probability, 27, 4, 1019-1053.

Glynn (1995), Likelihood ratio gradient estimation for regenerative stochastic recursions, Advances in Applied Probability, 27, 4, 10191053.

Izhikevich, 'Simple Model of Spiking Neurons', IEEE Transactions on Neural Networks, vol. 14, No. 6, Nov. 2003, pp. 1569-1572.

Izhikevich (2007), Solving the distal reward problem through linkage of STDP and dopamine signaling, Cerebral Cortex, vol. 17, pp. 244352.

Kiefer (1952), Stochastic Estimation of the Maximum of a Regression Function, Annals of Mathematical Statistics 23, #3, 462466.

Pfister (2003), Optimal Hebbian Learning: A Probabilistic Point of View, In ICANN Proceedings. Springer.

Larochelle et al., (2009), Exploring Strategies for Training Deep Neural Networks, J. of Machine Learning Research, v. 10, pp. 1-40.

Klampfl (2009), Spiking neurons can learn to solve information bottleneck problems and extract independent components, Neural Computation, 21(4), pp. 911-959.

Pfister (2006), Optimal Spike-Timing Dependent Plasticity for Precise Action Potential Firing in Supervised Learning, Neural computation ISSN 0899-7667, 18(6).

Reiman et al. (1989). Sensitivity analysis for simulations via likelihood ratios. Aper Res 37, 830844.

(56) References Cited

OTHER PUBLICATIONS

Robbins (1951), A Stochastic Approximation Method, Annals of Mathematical Statistics 22, #3, 400407.
Kleijnen et al., "Optimization and sensitivity analysis of computer simulation models by the score function method", Invited Review European Journal of Operational Research, Mar. 1995.
Rumelhart et al., (1986), Learning representations by back-propagating errors, Nature 323 (6088), pp. 533536.
Rumelhart (1986), Learning internal representations by error propagation, Parallel distributed processing, vol. 1 (pp. 318362), Cambridge, MA: MIT Press.
Sinyavskiy, et al. (2010), "Generalized Stochatic Spiking Neuron Model and Extended Spike Response Model in Spatial-Temporal Impulse Pattern Detection Task", Optical Memory and Neural Networks (Information Optics), 2010, vol. 19, No. 4, pp. 300-309.
Tishby et al., (1999), The information bottleneck method, In Proceedings of the 37th Annual Allerton Conference on Communication, Control and Computing, B Hajek & RS Sreenivas, eds., pp. 368-377, University of Illinois.
Toyoizumi (2007), Optimality Model of Unsupervised Spike-Timing Dependent Plasticity: Synaptic Memory and Weight Distribution, Neural Computation, 19 (3).
Toyoizumi et al., (2005), Generalized Bienenstock-Cooper-Munro rule for spiking neurons that maximizes information transmission, Proc. Natl. Acad. Sci. USA, 102, (pp. 52395244).
Weber et al., (2009), Goal-Directed Feature Learning, In: Proc, International Joint Conference on Neural Networks, 3319 3326.
Weaver (2001), The Optimal Reward Baseline for Gradient-Based Reinforcement Learning, UAI Proceedings of the 17th Conference in Uncertainty in Artificial Intelligence (pp. 538-545). Morgan Kaufman Publishers.
Williams (1992), Simple Statistical Gradient-Following Algorithms for Connectionist Reinforcement Learning, Machine Learning 8, 229256.
Yi (2009), Stochastic search using the natural gradient, ICML '09 Proceedings of the 26th Annual International Conference on Machine Learning. New York, NY, USA.
Rosenstein et al., (2002), Supervised learning combined with an actor-critic architecture, Technical Report 02-41, Department of Computer Science, University of Massachusetts, Amherst.
Amari (1998), Why natural gradient?, Acoustics, Speech and Signal Processing, 59 (pp. 1213-1216). Seattle, WA, USA.
Gluck. "Stimulus Generalization and Representation in Adaptive Network Models of Category Learning" Psychological Science, vol. 2, No. 1, Jan. 1991, pp. 50-55.
Fyfe et al., (2007), Reinforcement Learning Reward Functions for Unsupervised Learning, ISNN '07 Proceedings of the 4th international symposium on Neural Networks: Advances in Neural Networks.
Bohte, "Spiking Nueral Networks" Doctorate at the University of Leiden, Holland, Mar. 5, 2003, pp. 1-133 [retrieved on Nov. 14, 2012]. Retrieved from the internet: <URL: http://homepages.cwi.nl/-sbohte/publication/phdthesis.pdf>.
Brette et al., Brian: a simple and flexible simulator for spiking neural networks, The Neuromorphic Engineer, Jul. 1, 2009, pp. 1-4, doi: 10.2417/1200906.1659.
Cuntz et al., "One Rule to Grow Them All: A General Theory of Neuronal Branching and Its Paractical Application" PLOS Computational Biology, 6 (8), Published Aug. 5, 2010.
Davison et al., PyNN: a common interface for neuronal network simulators, Frontiers in Neuroinformatics, Jan. 2009, pp. 1-10, vol. 2, Article 11.
Djurfeldt, Mikael, The Connection-set Algebra: a formalism for the representation of connectivity structure in neuronal network models, implementations in Python and C++, and their use in simulators BMC Neuroscience Jul. 18, 2011 p. 1 12(Suppl 1):P80.
Fidjeland et al., Accelerated Simulation of Spiking Neural Networks Using GPUs [online], 2010 [retrieved on Jun. 15, 2013], Retrieved from the Internet: URL:http://ieeexplore.ieee.org/xpls/abs_all.jsp?arnumber=5596678&tag=1.

Floreano et al., "Neuroevolution: from architectures to learning" Evol. Intel. Jan. 2008 1:47-62, [retrieved Dec. 30, 2013] [retrieved online from URL:<http://inforscience.epfl.ch/record/112676/files/FloreanoDuerrMattiussi2008.pdf>.
Gewaltig et al., NEST (Neural Simulation Tool), Scholarpedia, 2007, pp. 1-15, 2( 4 ): 1430, doi: 1 0.4249/scholarpedia.1430.
Gleeson et al., ) NeuroML: A Language for Describing Data Driven Models of Neurons and Networks with a High Degree of Biological Detail, PLoS Computational Biology, Jun. 2010, pp. 1-19 vol. 6 Issue 6.
Goodman et al., Brian: a simulator for spiking neural networks in Python, Frontiers in Neuroinformatics, Nov. 2008, pp. 1-10, vol. 2, Article 5.
Gorchetchnikov et al., NineML: declarative, mathematically-explicit descriptions of spiking neuronal networks, Frontiers in Neuroinformatics, Conference Abstract: 4th INCF Congress of Neuroinformatics, doi: 1 0.3389/conf.fninf.2011.08.00098.
Graham, Lyle J., The Surf-Hippo Reference Manual, http://www.neurophys.biomedicale.univparis5. fr/-graham/surf-hippo-files/Surf-Hippo%20Reference%20Manual.pdf, Mar. 2002, pp. 1-128.
Izhikevich, "Polychronization: Computation with Spikes", Neural Computation, 25, 2006, 18, 245-282.
Izhikevich, "Simple Model of Spiking Neurons", IEEE Transactions on Neural Networks, vol. 14, No. 6, Nov. 2003, pp. 1569-1572.
Izhikevich, "Relating STDP to BCM", Neural Computation 15, 1511-1523 (2003).
Karbowski et al., "Multispikes and Synchronization in a Large Neural Network with Temporal Delays", Neural Computation 12, 1573-1606 (2000).
Khotanzad, "Classification of invariant image representations using a neural network" IEEF. Transactions on Acoustics, Speech, and Signal Processing, vol. 38, No. 6, Jun. 1990, pp. 1028-1038 [online], [retrieved on Dec. 10, 2013]. Retrieved from the Internet <URL: http://www-ee.uta.edu/eeweb/IP/Courses/SPR/Reference/Khotanzad.pdf>.
Laurent, "The Neural Network Query Language (NNQL) Reference" [retrieved on Nov. 12, 2013]. Retrieved from the Internet: URL:http://nnql.org/nnql.org.
Laurent, "Issue 1—nnql—Refactor Nucleus into its own file—Neural Network Query Language" [retrieved on Nov. 12, 2013]. Retrieved from the Internet: URL:https://code.google.com/p/nnql/issues/detail?id =1.
Nichols, A Reconfigurable Computing Architecture for Implementing Artificial Neural Networks on FPGA, Master's Thesis, The University of Guelph, 2003, pp. 1-235.
Pavlidis et al. Spiking neural network training using evolutionary algorithms. In: Proceedings 2005 IEEE International Joint Conference on Neural Networks, 2005. IJCNN'05, vol. 4, pp. 2190-2194 Publication Date Jul. 31, 2005 [online] [Retrieved on Dec. 10, 2013] Retrieved from the Internet <URL: http://citeseerx.ist.psu.edu/viewdoc/download?doi=10.1.1.5.4346&rep=rep1&type=pdf.
Paugam-Moisy et al., "Computing with spiking neuron networks" G. Rozenberg T. Back, J. Kok (Eds.), Handbook of Natural Computing, Springer-Verlag (2010) [retrieved Dec. 30, 2013], [retrieved online from link.springer.com].
Schemmel et al., Implementing synaptic plasticity in a VLSI spiking neural network model in Proceedings of the 2006 International Joint Conference on Neural Networks (IJCNN'06), IEEE Press (2006) Jul. 16-21, 2006, pp. 1-6 [online], [retrieved on Dec. 10, 2013]. Retrieved from the Internet <URL: http://www.kip.uni-heidelberg.de/veroeffentlichungen/download.cgi/4620/ps/1774.pdf>.
Simulink® model [online], [Retrieved on Dec. 10, 2013] Retrieved from <URL: http://www.mathworks.com/products/simulink/index.html>.
Sinyavskiy et al. "Reinforcement learning of a spiking neural network in the task of control of an agent in a virtual discrete environment" Rus. J. Nonlin. Dyn., 2011, vol. 7, No. 4 (Mobile Robots), pp. 859-875, chapters 1-8 (Russian Article with English Abstract).
Sjostrom J., W. Gerstner. Spike-Timing Dependent Plasticity. Scholarpedia, [Online], 2010, 5(2), 1362.
Szatmary et al., "Spike-timing Theory of Working Memory" PLoS Computational Biology, vol. 6, Issue 8, Aug. 19, 2010 [retrieved on

(56) References Cited

OTHER PUBLICATIONS

Dec. 20, 2013]. Retrieved from the Internet: <URL: http://www.ploscompbiol.org/article/info%3Adoi%2F10.1371%2Fjournal.pcbi.1000879#>.

PCT International Search Report for PCT/US2013/052127 dated Dec. 26, 2013.

Froemke et al., Temporal modulation of spike-timing-dependent plasticity, Frontiers in Synaptic Neuroscience, vol. 2, Article 19, pp. 1-16 [online] Jun. 2010 [retrieved on Dec. 16, 2013]. Retrieved from the internet: <frontiersin.org>.

International Search Report and Written Opinion—PCT/US2013/052127—ISA/EPO—Dec. 26, 2013.

* cited by examiner

APPARATUS AND METHODS FOR EFFICIENT UPDATES IN SPIKING NEURON NETWORK

CROSS-REFERENCE TO RELATED APPLICATIONS

This application is related to a co-owned and co-pending U.S. patent application Ser. No. 13/487,533, entitled "STOCHASTIC SPIKING NETWORK LEARNING APPARATUS AND METHODS" filed Jun. 4, 2012, co-owned U.S. patent application Ser. No. 13/489,280 entitled "APPARATUS AND METHODS FOR REINFORCEMENT LEARNING IN ARTIFICIAL NEURAL NETWORKS", filed Jun. 5, 2012, and a co-owned U.S. patent application Ser. No. 13/560,902 entitled "APPARATUS AND METHODS FOR GENERALIZED STATE-DEPENDENT LEARNING IN SPIKING NEURON NETWORKS" filed Jul. 27, 2012, each of the foregoing incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Field of the Disclosure

The present disclosure relates to implementing learning in spiking neuron networks.

2. Description of Related Art

Spiking Neural Networks

Artificial spiking neural networks may be frequently used to gain an understanding of biological neural networks, and/or for solving artificial intelligence problems. These networks may typically employ a pulse-coded mechanism, which may encode information using timing of the pulses. Such pulses (also referred to as "spikes" or 'impulses') may be short-lasting (typically on the order of 1-2 ms) discrete temporal events. Several exemplary embodiments of such encoding are described in a commonly owned and co-pending U.S. patent application Ser. No. 13/152,084 filed Jun. 2, 2011, and entitled APPARATUS AND METHODS FOR PULSE-CODE INVARIANT OBJECT RECOGNITION", and U.S. patent application Ser. No. 13/152,119 filed Jun. 2, 2011, and entitled "SENSORY INPUT PROCESSING APPARATUS AND METHODS", each being incorporated herein by reference in its entirety.

A typical artificial spiking neural network, such as the network 100 shown for example in FIG. 1, may comprise a plurality of units (or nodes) 102, which may correspond to neurons in a biological neural network. Any given unit 102 may receive input via connections 104, also referred to as communications channels, or synaptic connections. Any given unit 102 may further be connected to other units via connections 112, also referred to as communications channels, or synaptic connections. The units (e.g., the units 106 in FIG. 1) providing inputs to any given unit via for example connections 104, are commonly referred to as the pre-synaptic units, while the unit receiving the inputs (e.g., the units 102 in FIG. 1) is referred to as the post-synaptic unit. Furthermore, the post-synaptic unit of one unit layer (e.g. the units 102 in FIG. 1) may act as the pre-synaptic unit for the subsequent upper layer of units (not shown).

Individual ones of the connections (104, 112 in FIG. 1) may be assigned, inter alia, a connection efficacy (which in general may refer to a magnitude and/or probability of influence of pre-synaptic spike to firing of post-synaptic neuron, and may comprise, for example a parameter: synaptic weight, by which one or more state variables of post synaptic unit are changed). During operation of the pulse-code network (e.g., the network 100), synaptic weights may be typically adjusted using what is referred to as the spike-timing dependent plasticity (STDP) in order to implement, among other things, network learning.

One such adaptation mechanism is illustrated with respect to FIGS. 2-3. Traces 200, 210 in FIG. 2 depict pre-synaptic input spike train (delivered for example via connection 104_1 in FIG. 1) and post synaptic output spike train (generated, for example, by the neuron 102_1 in FIG. 1), respectively.

Properties of the connections 104 (such as weights w) may be typically adjusted based on relative timing between the pre-synaptic input (e.g., the pulses 202, 204, 206, 208 in FIG. 2) and post-synaptic output pulses (e.g., the pulses 214, 216, 218 in FIG. 2). One typical STDP weight adaptation rule is illustrated in FIG. 3, where rule 300 depicts synaptic weight change $\Delta w$ as a function of time difference between the time of post-synaptic output generation and arrival of pre-synaptic input $\Delta t = t_{post} - t_{pre}$. In some implementations, synaptic connections (e.g., the connections 104 in FIG. 1) delivering pre-synaptic input prior to the generation of post-synaptic response may be potentiated (as indicated by $\Delta w > 0$ associated with the curve 304 in FIG. 3), while synaptic connections (e.g., the connections 104 in FIG. 1) delivering pre-synaptic input subsequent to the generation of post-synaptic response may be depressed). By way of illustration, when the post-synaptic pulse 208 in FIG. 2 is generated: (i) connection associated with the pre-synaptic input 214 precedes the output pulse (indicated by the line denoted 224) and it may be potentiated ($\Delta w > 0$ in FIG. 3 and the weight is increased); and (ii) connections associated with the pre-synaptic input 216, 218 that follow may be depressed.

Spiking Neuron Models

Generalized dynamics equations for spiking neurons models may be often expressed as a superposition of input, interaction between the input current and the neuronal state variables, and neuron reset after the spike as follows:

$$\frac{d\vec{q}}{dt} = V(\vec{q}) + \sum_{t^{out}} R(\vec{q})\delta(t - t^{out}) + G(\vec{q})I^{ext},$$

where:

$\vec{q}$ is a vector of internal state variables (e.g., comprising membrane voltage);

$I^{ext}$ is external input into neuron;

V is the function that defines evolution of the state variables;

G describes the interaction between the input current and the state variables (for example, to model postsynaptic potentials); and R describes resetting the state variables after the output spikes at $t^{out}$.

For example, for IF model the state vector and the state model may be expressed as:

$$\vec{q}(t) \equiv u(t); V(\vec{q}) = -Cu; R(\vec{q}) = u_{res}; G(\vec{q}) = 1, \quad \text{(Eqn. 2)}$$

where C—membrane constant, $u_{res}$—value to which voltage is set after output spike (reset value). Accordingly, Eqn. 1 becomes:

$$\frac{du}{dt} = -Cu + \sum_{t^{out}} (u_{refr} - u)\delta(t - t^{out}) + I^{ext}. \quad \text{(Eqn. 3)}$$

For the simple neuron model described by Izhikevich E. M., 2003, Eqn. 1 may be expressed as:

$$\frac{dv}{dt} = 0.04v^2 + 5v + 140 - u + \sum_{t^{out}} (c - v)\delta(t - t^{out}) + I^{ext}, \quad \text{(Eqn. 4)}$$

and $$\frac{du}{dt} = -a(bv - u) + d\sum_{t^{out}} \delta(t - t^{out}),$$

where:

$$\vec{q}(t) \equiv \begin{pmatrix} v(t) \\ u(t) \end{pmatrix}; \quad V(\vec{q}) = \begin{pmatrix} 0.04v^2(t) + 5v(t) + 140 - u(t) \\ a(bv(t) - u(t)) \end{pmatrix}; \quad \text{(Eqn. 5)}$$

$$R(\vec{q}) = \begin{pmatrix} c - v(t) \\ d \end{pmatrix}; \quad G(\vec{q}) = \begin{pmatrix} 1 \\ 0 \end{pmatrix}$$

and a,b,c,d are parameters of the model.

Some algorithms for spike-time learning (especially, reinforcement learning) in spiking neural networks are typically represented using the following general equation described, for example, in co-pending and co-owned U.S. patent application Ser. No. 13/489,280, filed Jun. 5, 2012, 2012, entitled "APPARATUS AND METHODS FOR REINFORCEMENT LEARNING IN ARTIFICIAL SPIKING NEURAL NETWORKS", incorporated supra:

$$\frac{d\theta_i(t)}{dt} = \eta F(t) e_i(t), \quad \text{(6)}$$

where:
- $\theta_i(t)$ is an adaptation (learning) parameter of a synaptic connection between the pre-synaptic neuron i and the post-synaptic neuron j;
- $\eta$ is a parameter referred to as the learning rate, $\eta$ can be a constant parameter or it can be a function of some other system parameters;
- F(t) is a performance function; and
- $e_i(t)$ is eligibility trace, configured to characterize relations between pre-synaptic and post-synaptic activity.

By way of background, an exemplary eligibility trace may comprise a temporary record of the occurrence of an event, such as visiting of a state or the taking of an action, or a receipt of pre-synaptic input. The trace marks the parameters associated with the event (e.g., the synaptic connection, pre- and post-synaptic neuron IDs) as eligible for undergoing learning changes. In one approach, when a reward signal occurs, only eligible states or actions may be 'assigned credit' or 'blamed' for the error. Thus, the eligibility traces aid in bridging the gap between the events and the training information.

In some approaches, such as described for example in a co-owned and co-pending U.S. patent application Ser. No. 13/489,280 entitled "APPARATUS AND METHODS FOR REINFORCEMENT LEARNING IN ARTIFICIAL NEURAL NETWORKS", filed Jun. 5, 2012, incorporated supra. The above reference application may describe synapses of the neuron by a linear dynamic process, characterized by a state vector $\vec{S}_i$:

$$\frac{d\vec{S}_i(t)}{dt} = -A(q, t, t^{out})\vec{S}_i(t) + \vec{k}_i \sum_j \delta(t - t_j^{in}) + \sum_{t^{out}} Rs(t)\delta(t - t^{out}), \quad \text{(7)}$$

where:
- A(t) is a stable matrix, dependent on the state q of the neuron, output spike time $t^{out}$, and/or time;
- $\Sigma_j \delta(t - t_j^{in})$ is the term describing the input spike train;
- $\vec{k}_i$ is vector coefficient characterizing individual synapses and effect of the presynaptic spikes on it; and
- Rs(t) describes resetting the synapse state vector $\vec{S}_i$ after the output spikes at $t^{out}$.

Synaptic state variable can be subject to reset depending on neuron firing times. Synaptic state can be used as a component in different neuronal mechanisms, such as short-term and long-term plasticity.

For example, as described in detail in U.S. patent application Ser. No. 13/560,902 entitled "APPARATUS AND METHODS FOR GENERALIZED STATE-DEPENDENT LEARNING IN SPIKING NEURON NETWORKS", filed Jul. 27, 2012 incorporated supra, eligibility traces $e_i(t)$ of Eqn. 6 for a broad spectrum of long-term plasticity learning rules may be expressed as:

$$\frac{de_i(t)}{dt} = -\frac{e_i(t)}{\tau} + Q(t)S_{ik}(t), \quad \text{(Eqn. 8)}$$

where:
- $\tau$ is a time constant,
- Q(t) is a function of a state of the neuron q that is the same for individual synapses, and
- $S_{ik}(t)$ is the k-th element in the synaptic state vector $\vec{S}_i$.

In spiking neurons simulations Eqn. 7-Eqn. 8 may be typically solved using numerical integration techniques such as Euler integration rule:

$$S_i(t+1) = S_i(t) - \Delta t[AS_i(t) - k_i\delta(t - t_i^{in})], \text{ and} \quad \text{(Eqn. 9)}$$

$$e_i(t+1) = e_i(t) - \Delta t[e_i(t)/\tau - Q(t)S_{ik}(t)], \quad \text{(Eqn. 10)}$$

where:
- $\delta(t - t_i^{in}) = 1$ for $t = t_i^{in}$; and 0 otherwise,
- $\delta t$ is the update time step.

In some implementations, the post-synaptic spike synapse state traces may be subject to a reset condition upon generation of the post-synaptic spike. In one or more implementations, the reset may be implemented by determining the state trace value $e_i$ in accordance, for example, with Eqn. 10. In some implementations, the value of the state parameter $S_i$ (taken prior to the reset) may be used be used in Eqn. 10 in order to determine $e_i$ as follows:

$$S_i(t+1) = Rs(S_i(t))\delta(t - t^{out}), \quad \text{(Eqn. 11)}$$

where Rs is the reset function.

By way of illustration, when a number of computations to be performed for individual synapses at individual update time steps is C, then for a neuron interfaced to NS synapses, the total number of computations (per time step) becomes NC=C×NS. In order to perform adequately complex neural network simulations, the number of synapses per neuron NS may be typically configured between 100 and 100,000. Hence, in order to evaluate neuronal state at 1 ms intervals (the update rate frequently used in the arts), the required number of computations per neuron per time step may be NC=C×[100-100,000] per neuron per time step. Such high computational load may place demanding requirements on computational power of the neuromorphic hardware. Furthermore, the computational load scales with the number of synapses, thus severally limiting number of neurons that may be operated by the neuromorphic processing and/or frequency of network updates which may negatively affect network precision.

Accordingly, there may be a salient need for a more efficient method and apparatus for implementing synaptic updates in spiking neural network comprising medium to high density of synapses.

SUMMARY

The present disclosure satisfies the foregoing needs by providing, inter alia, apparatus and methods for implementing generalized probabilistic learning configured to handle simultaneously various learning rule combinations.

One aspect of the disclosure relates to a system, apparatus, method, and/or computer-readable storage medium associated with implementing an update of learning parameters of a plurality of connections of a spiking neuron. In some implementations, the method may comprise operating the neuron in accordance with a process configured to be updated at time intervals. The method may comprise storing a time history of one or more inputs provided to the neuron via the plurality of connections. The time history of a given input may be descriptive of a time at which the given input occurs. The storing of the time history may be performed within a time window comprising a plurality of the time intervals. The method may include receiving an indication conveying whether the update is to be performed. The method may comprise, responsive to the indication, determining a plurality of input-dependent connection change components (IDCC). Individual ones of the plurality of the IDCC components may be associated with individual ones of the plurality of the time intervals. The plurality of IDCC components may be based on the time of the indication and time of individual ones of the one or more inputs corresponding to individual ones of the plurality of the time intervals. The method may include effectuating the update by adjusting the learning parameters. The adjustment may be determined based on the plurality of the IDCC components.

In some implementations, the update may further comprise a determination of a plurality of eligibility traces. Individual ones of the plurality of eligibility traces may be associated with a given one of the plurality of connections and comprising a temporary record of occurrence of at least one of the one or more inputs on the given one of the plurality of connections. The determination of the plurality of eligibility traces may be effectuated based on an integration of respective ones of the plurality of IDCC components.

Another aspect of the disclosure relates to a system, apparatus, method, and/or computer-readable storage medium associated with operating a plurality of data interfaces in a computerized network. The method may include storing a time record of one or more data items capable of being provided via the plurality of data interfaces. The time record of a given data item may be descriptive of a time at which the given data item occurred. The method may include, based on an indication conveying whether an update is to be performed, updating a plurality of parameters. The plurality of parameters may be associated with the plurality of data interfaces. The updating may include one or more of (1) reading previous values of the plurality of parameters, (2) determining updated values of the plurality of parameters, or (3) storing the updated values of the plurality of parameters. The determining updated values may be based on at least a portion of the time record. The portion may cover a time interval prior to the indication. The determining updated values may comprise a number of operations that is proportional to a number of the one or more data items. The number of operations may be independent from a number of the plurality of data interfaces.

In some implementations, the method may include operating individual ones of the plurality of data interfaces in accordance with an interface dynamic process. The dynamic process may be characterized by a dynamic state capable of being updated at time periods. The dynamic process may be characterized by a decay interval. The time interval may be configured to cover a period of at least the decay time window. The determining updated values may comprise obtaining, based on the indication and the time record, a plurality of interface change components. Individual ones of the plurality interface change components may be configured to characterize a change of individual ones of the plurality of parameters being effectuated at a time instance associated with the indication, due to the one or more data items occurring within the time interval window.

In some implementations, the computerized network may comprise a spiking neuron network (SNN). Individual ones of the plurality of data interfaces may comprise synaptic connections of the SNN. Individual ones of the plurality of parameters may comprise a synaptic weight of respective synaptic connection. The weight may be based at least on an occurrence of a data item of the one or more data items within the time interval. The decay time window may comprise an exponential decay window characterized by a decrease of the weight by a factor of about 2.7 within a duration of the exponential decay window.

In some implementations, the SNN may be capable of implementing a learning process characterized by an external signal. The learning process may be configured to produce an outcome. The update may be capable of aiding the outcome being produced. The indication may comprise at least a portion of the external signal.

In some implementations, individual ones of the plurality of parameters may comprise a connection delay associated with a respective one of the plurality of the data interfaces. The plurality of interface change components may be capable of providing update of the plurality of data interfaces.

In some implementations, the time period may comprise a regular period of equal duration. Individual ones of the plurality interface change components may be associated with a respective time period occurring at an integer number of the durations prior to the indication time instance. One or more interface change components may be determined based on a difference between (i) the respective time period and (ii) the indication time instance.

In some implementations, individual ones of the one or more interface change components may be associated with at least one data item of the one or more data items occurring within the respective time period.

In some implementations, the indication may be based on one or both of (i) an occurrence of a data item of one or more data items or (ii) a timer event indicative of an expiration of current update time period.

Another aspect of the disclosure relates to a system, apparatus, method, and/or computer-readable storage medium associated with reducing a computational load for operating a plurality of communication interfaces of a network node. The system may include one or more processors configured to execute one or more computer program modules to perform one or more operations. The one or more operations may include operating the node in accordance with a node dynamic process being capable of being updated at time intervals. The one or more operations may include, based on an indication, conveying whether an update is to be performed. The one or more operations may include reducing the computational load by effectuating an update of a plurality of parameters associated with the plurality of communication interfaces. The update may be based on one or more data items being communicated via at least one of the plurality of communication interfaces prior to the indication. The update of the plurality of parameters may comprise a number of operations being independent from a number of the plurality of communication interfaces.

In some implementations, the indication may be based on an output being generated by the spiking neuron.

In some implementations, individual ones of the plurality of data interfaces may be configured to operate in accordance with a linear interface dynamic process characterized by a stable equilibrium having a decay time scale associated therewith.

In some implementations, individual ones of the plurality of parameters may comprise a weight. The weight may be configured to modify a state of the node based on an occurrence of a data item of the one or more data items within the decay time scale. The update may be based on one or more of: (1) a decomposition of an interface state associated with the linear interface dynamic process into a plurality of stereotypical components; (2) a determination of individual ones of the plurality of stereotypical components based on a time difference between occurrence of the indication and occurrence of the one or more data items; or (3) a linear combination of the plurality of stereotypical components, the linear combination being determined based on a value of individual ones of the plurality of stereotypical components corresponding to a time of the occurrence of the one or more data items, the value being discounted in accordance with the decay time scale and the time difference.

In some implementations, execution of individual ones of the one or more computer program modules may cause the one or more processors to store a time history conveying when the one or more data items were provided within a time window via the plurality of communication interfaces. The time window may be equal or longer the decay time scale.

In some implementations, the number of the components may be selected between 2 and 40, inclusive. The number of the plurality of communication interfaces may be selected between 41 and 100000, inclusive.

In some implementations, the update of the plurality of parameters may comprise determining a plurality of interface change components based on the indication and the time-history. Individual ones of the plurality interface change components may be configured to characterize a change of the state being effectuated at an indication time instance associated with the indication responsive to the one or more data items occurring within the decay window prior to the indication time instance.

In some implementations, the linear interface dynamic process may be configured to be periodically updated at a time interval. The decay window may comprise two or more of the time intervals. The determining of the plurality of interface change components may be effectuated via a look-up table. The look-up table may comprise two or more entries associated with the two or more of the time intervals. Individual ones of the plurality of interface change components may be configured independent of the state of the node to enable determination of the look-up table prior to a first occurrence of the time interval to alleviate determination of the look-up table for individual ones of the updates.

In some implementations, the linear interface dynamic process may be configured to be periodically updated at a time interval. The decay window may comprise two or more the time intervals. The determining of the plurality of interface change components may be effectuated via a look-up table comprising two or more entries associated with the two or more of the time intervals. Individual ones of the plurality of interface change components may be configured based on the state of the node. The look-up table may be determined for two or more of the updates.

In some implementations, the update may comprise an on-demand update. The indication may comprise a buffer event associated with the storing of the history.

In some implementations, the node state update may be characterized by a cyclic update effectuated at a regular time interval. The indication may comprise a timer event associated with the regular time interval.

In some implementations, the node state update may comprise a cyclic update effectuated at regular time interval. The indication may be based on the data item of the one or more data items communicated via at least one of the plurality of communication interfaces.

In some implementations, the update may be delayed until a next regular time interval occurring subsequent to occurrence of the data item of the one or more data items.

In some implementations, the node dynamic process may comprise a reinforcement learning process configured to produce an outcome. The update of the plurality of parameters may be capable of aiding the outcome being produced. The indication may comprise a reinforcement spike generated based on an evaluation of node output versus the outcome.

These and other objects, features, and characteristics of the present disclosure, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and in the claims, the singular form of "a", "an", and "the" include plural referents unless the context clearly dictates otherwise.

Figure 1:
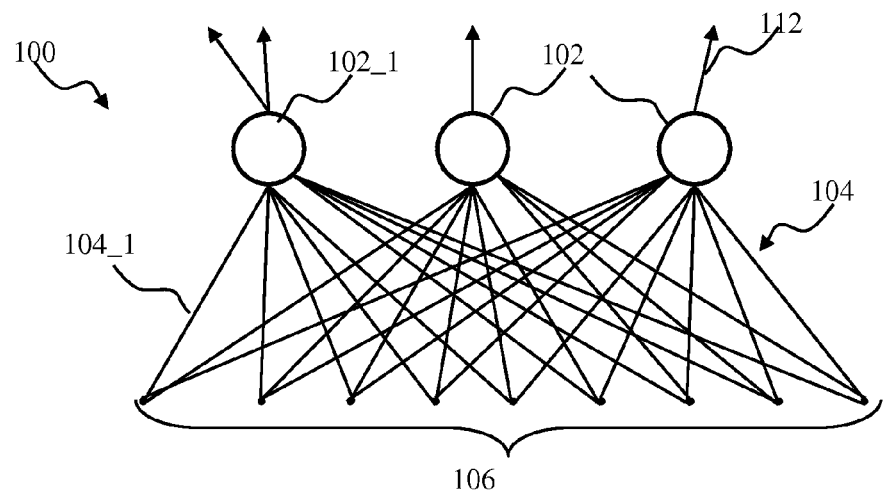
FIG. 1 is a block diagram depicting artificial spiking neural network according to the prior art.

All Figures disclosed herein are © Copyright 2012 Brain Corporation. All rights reserved.

DETAILED DESCRIPTION

Exemplary implementations of the present disclosure will now be described in detail with reference to the drawings, which are provided as illustrative examples so as to enable those skilled in the art to practice the disclosure. Notably, the figures and examples below are not meant to limit the scope of the present disclosure to a single implementation, but other implementations are possible by way of interchange of or combination with some or all of the described or illustrated elements. Wherever convenient, the same reference numbers will be used throughout the drawings to refer to same or similar parts.

Where certain elements of these implementations can be partially or fully implemented using known components, only those portions of such known components that are necessary for an understanding of the present disclosure will be described, and detailed descriptions of other portions of such known components will be omitted so as not to obscure the disclosure.

In the present specification, an implementation showing a singular component should not be considered limiting; rather, the disclosure is intended to encompass other implementations including a plurality of the same component, and vice-versa, unless explicitly stated otherwise herein.

Further, the present disclosure encompasses present and future known equivalents to the components referred to herein by way of illustration.

As used herein, the term "bus" is meant generally to denote all types of interconnection or communication architecture that is used to access the synaptic and neuron memory. The "bus" may be optical, wireless, infrared, and/or another type of communication medium. The exact topology of the bus could be for example standard "bus", hierarchical bus, network-on-chip, address-event-representation (AER) connection, and/or other type of communication topology used for accessing, e.g., different memories in pulse-based system.

As used herein, the terms "computer", "computing device", and "computerized device" may include one or more of personal computers (PCs) and/or minicomputers (e.g., desktop, laptop, and/or other PCs), mainframe computers, workstations, servers, personal digital assistants (PDAs), handheld computers, embedded computers, programmable logic devices, personal communicators, tablet computers, portable navigation aids, J2ME equipped devices, cellular telephones, smart phones, personal integrated communication and/or entertainment devices, and/or any other device capable of executing a set of instructions and processing an incoming data signal.

As used herein, the term "computer program" or "software" may include any sequence of human and/or machine cognizable steps which perform a function. Such program may be rendered in a programming language and/or environment including one or more of C/C++, C#, Fortran, COBOL, MATLAB™, PASCAL, Python, assembly language, markup languages (e.g., HTML, SGML, XML, VoXML), object-oriented environments (e.g., Common Object Request Broker Architecture (CORBA)), Java™ (e.g., J2ME, Java Beans), Binary Runtime Environment (e.g., BREW), and/or other programming languages and/or environments.

As used herein, the terms "connection", "link", "transmission channel", "delay line", "wireless" may include a causal link between any two or more entities (whether physical or logical/virtual), which may enable information exchange between the entities.

As used herein, the term "memory" may include an integrated circuit and/or other storage device adapted for storing digital data. By way of non-limiting example, memory may include one or more of ROM, PROM, EEPROM, DRAM, Mobile DRAM, SDRAM, DDR/2 SDRAM, EDO/FPMS, RLDRAM, SRAM, "flash" memory (e.g., NAND/NOR), memristor memory, PSRAM, and/or other types of memory.

As used herein, the terms "integrated circuit", "chip", and "IC" are meant to refer to an electronic circuit manufactured by the patterned diffusion of trace elements into the surface of a thin substrate of semiconductor material. By way of non-limiting example, integrated circuits may include field programmable gate arrays (e.g., FPGAs), a programmable logic device (PLD), reconfigurable computer fabrics (RCFs), application-specific integrated circuits (ASICs), and/or other types of integrated circuits.

As used herein, the terms "microprocessor" and "digital processor" are meant generally to include digital processing devices. By way of non-limiting example, digital processing devices may include one or more of digital signal processors (DSPs), reduced instruction set computers (RISC), general-purpose (CISC) processors, microprocessors, gate arrays (e.g., field programmable gate arrays (FPGAs)), PLDs, reconfigurable computer fabrics (RCFs), array processors, secure microprocessors, application-specific integrated circuits (ASICs), and/or other digital processing devices. Such digital processors may be contained on a single unitary IC die, or distributed across multiple components.

As used herein, the term "network interface" refers to any signal, data, and/or software interface with a component, network, and/or process. By way of non-limiting example, a network interface may include one or more of FireWire (e.g., FW400, FW800, etc.), USB (e.g., USB2), Ethernet (e.g., 10/100, 10/100/1000 (Gigabit Ethernet), 10-Gig-E, etc.), MoCA, Coaxsys (e.g., TVnet™), radio frequency tuner (e.g., in-band or OOB, cable modem, etc.), Wi-Fi (802.11), WiMAX (802.16), PAN (e.g., 802.15), cellular (e.g., 3G, LTE/LTE-A/TD-LTE, GSM, etc.), IrDA families, and/or other network interfaces.

As used herein, the terms "node", "neuron", and "neuronal node" are meant to refer, without limitation, to a network unit (e.g., a spiking neuron and a set of synapses configured to provide input signals to the neuron) having parameters that are subject to adaptation in accordance with a model.

As used herein, the terms "state" and "node state" is meant generally to denote a full (or partial) set of dynamic variables used to describe node state.

As used herein, the term "synaptic channel", "connection", "link", "transmission channel", "delay line", and "communications channel" include a link between any two or more entities (whether physical (wired or wireless), or logical/virtual) which enables information exchange between the entities, and may be characterized by a one or more variables affecting the information exchange.

As used herein, the term "Wi-Fi" includes one or more of IEEE-Std. 802.11, variants of IEEE-Std. 802.11, standards related to IEEE-Std. 802.11 (e.g., 802.11 a/b/g/n/s/v), and/or other wireless standards.

As used herein, the term "wireless" means any wireless signal, data, communication, and/or other wireless interface. By way of non-limiting example, a wireless interface may include one or more of Wi-Fi, Bluetooth, 3G (3GPP/3GPP2), HSDPA/HSUPA, TDMA, CDMA (e.g., IS-95A, WCDMA, etc.), FHSS, DSSS, GSM, PAN/802.15, WiMAX (802.16), 802.20, narrowband/FDMA, OFDM, PCS/DCS, LTE/LTE-A/TD-LTE, analog cellular, CDPD, satellite systems, millimeter wave or microwave systems, acoustic, infrared (i.e., IrDA), and/or other wireless interfaces.

Overview

The present disclosure provides, among other things, a computerized apparatus and methods for facilitating learning spiking neuron networks by, inter alia, implementing efficient synaptic updates. In one or more implementations, the network may comprise linear synaptic dynamic process, characterized by stable equilibrium. The state of neurons and synapses within the network may be updated, based on inputs and outputs to/from neurons. In some implementations, the updates may be implemented at regular time intervals Δt. In one or more implementations, the updates may be implemented on-demand, based on network activity (e.g., neuronal output and/or input) so as to further reduce computational load associated with the synaptic updates.

In accordance with the principles of the disclosure, multiple synaptic updates may be configured to be executed on per neuron basis, as opposed to per-synapse basis of prior art. The cumulative synaptic plasticity update in accordance with some implementations may be factored (decomposed) into multiple event-dependent connection change (EDCC) components. The EDCC components may be configured to describe synapse plasticity change due to neuronal input spike (i.e., the spike transmitted by a synapse from a pre-synaptic neuron into a post-synaptic neuron) occurring at time $t_i \leq t_{update}$. In order to effectuate factoring of the synaptic updates, at individual update instances $t_{update}$ (e.g., cyclic and/or on-demand), two or more EDCC components may be computed, with individual components corresponding to one prior network state update time interval $t_i$. The number of EDCC components computed may be configured based on (i) the plasticity rule decay time scale used by the network, and (ii) the network update interval $\Delta t$. By way of illustration, if the plasticity decay time-scale T is 20 ms and the network state is updated at 1 ms intervals, then at individual synaptic update events at time t, a number $nT=T/\Delta t$ of EDCC components (nT=20 in one or more implementations) may be computed, with individual components corresponding to the plasticity change due to input (pre-synaptic) spike occurring at time $t_i=t-(i-1)\times\Delta t$, $i=\{1, \ldots, nT\}$. It is noteworthy, that the nT EDCC components may be computed once for all synapses associated with the neuron, and the occurrence times of input spikes within the time interval (t–T) prior to updates may be used to reference appropriate EDCC component.

In some implementations, where the EDCC components are independent of neuronal state, the $S_i$ array (EDCC look up table (LUT)) may be computed once per network operation run (simulation) and used for individual synaptic updates.

In some implementations, where the EDCC components may be dependent on an external parameter Dp, to simulate dopamine effects within animal neural system. In one or more implementations, the external parameter Dp may comprise a common parameter to all neurons within the network. In some implementations, the external parameter Dp may be configured intrinsic to individual neurons. In one or more implementations, individual $S_i$ components may comprise the same magnitude and the same decay scale. In some implementations, such as when synapse dynamics is time dependent, $S_i$ components may be configured to comprise time-dependent contribution. In some implementations, the decay parameters may be configured as time varying for some or all synapses. In some implementations, the time varying decay parameters may be implemented using the intrinsic plasticity mechanism.

Spiking Neuron Network

Detailed descriptions of the various implementation of apparatus and methods of the disclosure are now provided. Although certain aspects of the disclosure can best be understood in the context of robotic adaptive control system comprising a spiking neural network, the disclosure is not so limited. Implementations of the disclosure may also be used for implementing a variety of learning systems, such as, for example, sensory signal processing (e.g., computer vision), signal prediction (e.g., supervised learning), finance applications, data clustering (e.g., unsupervised learning), inventory control, data mining, and/or other applications that do not require performance function derivative computations.

Implementations of the disclosure may be, for example, deployed in a hardware and/or software implementation of a neuromorphic computer system. In some implementations, a robotic system may include a processor embodied in an application specific integrated circuit, which can be adapted or configured for use in an embedded application (e.g., a prosthetic device).

Figure 4:
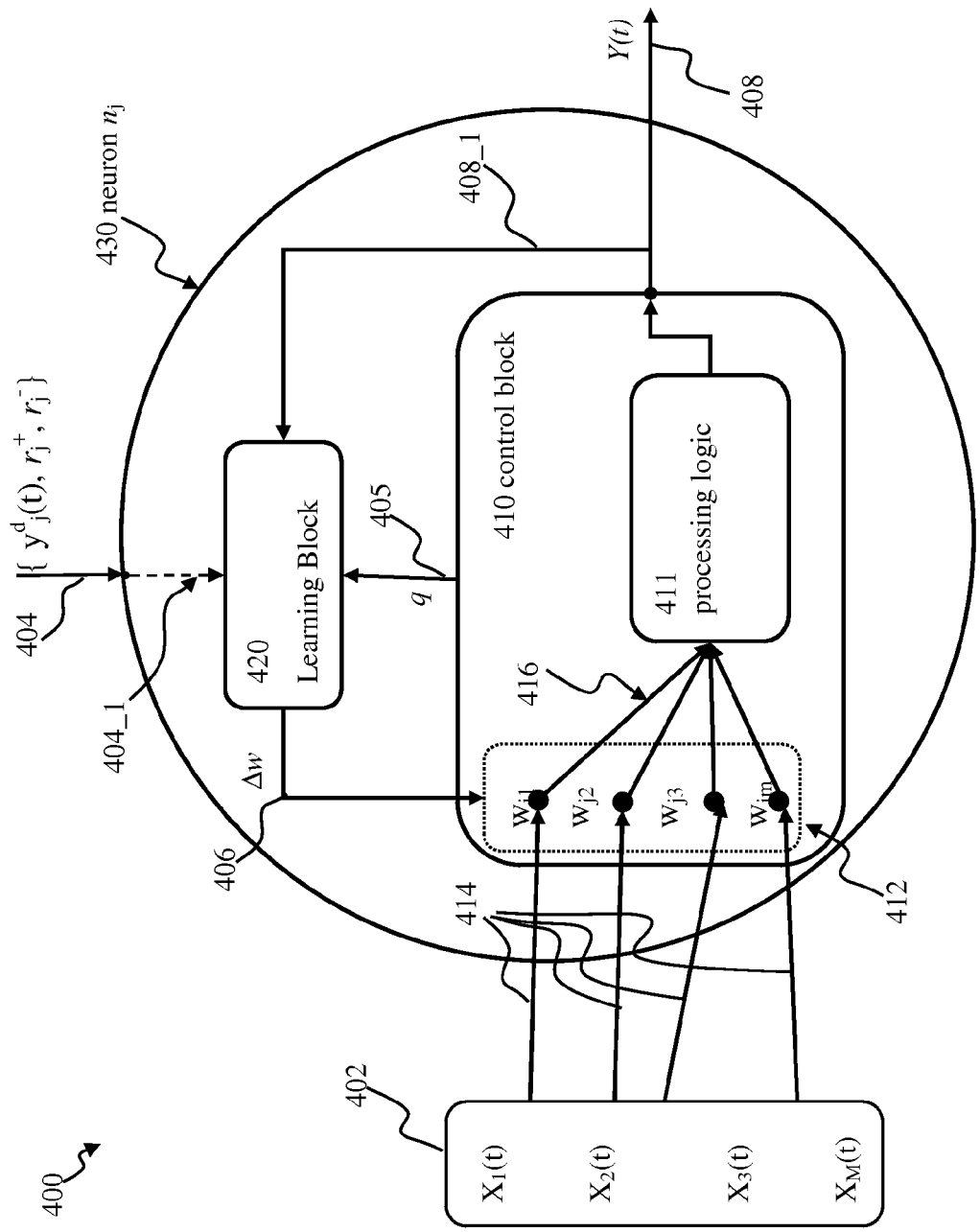
FIG. 4 is a block diagram illustrating spiking neural network configured to effectuate multiple learning rules, in accordance with one or more implementations.

Referring now to FIG. 4, one implementation of spiking network apparatus for effectuating the generalized learning framework of the disclosure is shown and described in detail. The network 400 may comprise at least one stochastic spiking neuron 430, operable according to, for example, a Spike Response Process (SRP), and configured to receive M-dimensional input spiking stream X(t) 402 via M-input connections 414. In some implementations, the M-dimensional spike stream may correspond to M-input synaptic connections into the neuron 430. As shown in FIG. 4, individual input connections may be characterized by a connection parameter 412 $w_{ij}$ that may be configured to be adjusted during learning. In one or more implementations, the connection parameter may comprise connection efficacy (e.g., weight). In some implementations, the parameter 412 may comprise synaptic delay. In some implementations, the parameter 412 may comprise probabilities of synaptic transmission.

The following signal notation may be used in describing operation of the network 400, below:

$y(t)=\Sigma_k \delta(t-t_k^{out})$ denotes the output spike pattern, corresponding to the output signal 408 produced by the control block 410, where $t_k$ denotes the times of the output spikes generated by the neuron; and $y^d(t)=\Sigma_{t_k} \delta(t-t_k^d)$ denotes the teaching spike pattern, corresponding to the desired (or reference) signal that may be part of external signal 404 of FIG. 4, where $t_k^d$ denotes the times when the spikes of the reference signal are received by the neuron.

In some implementations, the neuron 430 may be configured to receive training inputs, comprising the desired output (reference signal) $y^d(t)$ via the connection 404. In some implementations, the neuron 430 may be configured to receive positive and negative reinforcement signals via the connection 404. Accordingly, parameters $r^+$, $r^-$ in of FIG. 4 denotes the reinforcement signal spike stream, that may be expressed as:

$$r^+(t)=\Sigma_i \delta(t-t_i^+), r^-(t)=\Sigma_i \delta(t-t_i^-),$$

where $t_i^+$, $t_i^-$ denote the spike times associated, for example, with positive and negative reinforcement, respectively.

The neuron 430 may be configured to implement the control block 410 which may be configured to control, for example, a robotic arm and may be parameterized by the weights of connections between artificial neurons, and a learning block 420, which may implement learning and/or calculating the changes in the connection weights. The control block 410 may receive an input signal x, and may generate an output signal y. The output signal y may include motor control commands configured to move a robotic arm along a desired trajectory. The control block 410 may be characterized by a system model comprising system internal state variables q. The internal state variable q may include a membrane voltage of the neuron, conductance of the membrane, and/or other variables. The control block 410 may be characterized by learning parameters w, which may include synaptic weights of the connections, firing threshold, resting potential of the neuron, and/or other parameters. In one or more implementations, the parameters w may comprise probabilities of signal transmission between the units (e.g., neurons) of the network.

The input signal x(t) may comprise data used for solving a particular control task. In one or more implementations, such as those involving a robotic arm or autonomous robot, the signal x(t) may comprise a stream of raw sensor data (e.g., proximity, inertial, and/or terrain imaging) and/or preprocessed data (e.g., velocity, extracted from accelerometers, distance to obstacle, and/or positions). In some implementations, such as those involving object recognition, the signal x(t) may comprise an array of pixel values (e.g., RGB, CMYK, HSV, HSL, and/or grayscale) in the input image, or preprocessed data (e.g., levels of activations of Gabor filters for face recognition, contours, and/or other preprocessed data). In one or more implementations, the input signal x(t) may comprise desired motion trajectory, for example, in order to predict future state of the robot on the basis of current state and desired motion.

The control block 410 of FIG. 4 may comprise a probabilistic dynamic system, which may be characterized by an analytical input-output (x→y) probabilistic relationship having a conditional probability distribution associated therewith:

$$P=p(y|x,w). \quad \text{(Eqn. 12)}$$

In Eqn. 12, parameter w may denote various system parameters including connection efficacy, firing threshold, resting potential of the neuron, and/or other parameters. The analytical relationship of Eqn. 12 may be selected such that the gradient of ln[p(y|x,w)] with respect to the system parameter w exists and can be calculated. The neuronal network shown in FIG. 4 may be configured to estimate rules for changing the system parameters (e.g., learning rules) so that the performance function F(x,y,r) may be minimized (or maximized) for the current set of inputs and outputs and system dynamics.

In some implementations, the control performance function may be configured to reflect the properties of inputs and outputs (x,y). The values F(x,y,r) may be calculated directly by the learning block 420 without relying on external signal r when providing solution of unsupervised learning tasks.

In some implementations, the value of the function F may be calculated based on a difference between the output y of the control block 410 and a reference signal $y^d$ characterizing the desired control block output. This configuration may provide solutions for supervised learning tasks, as described in detail below.

In some implementations, the value of the performance function F may be determined based on the external signal r. This configuration may provide solutions for reinforcement learning tasks, where r represents reward and punishment signals from the environment.

Figure 2:
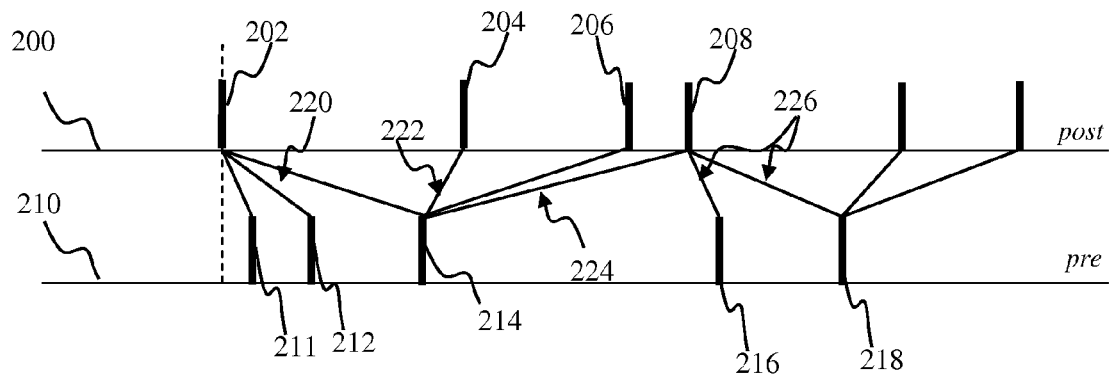
FIG. 2 is a graphical illustration depicting spike timing in the spiking network of FIG. 1, according to the prior art.
Figure 3:
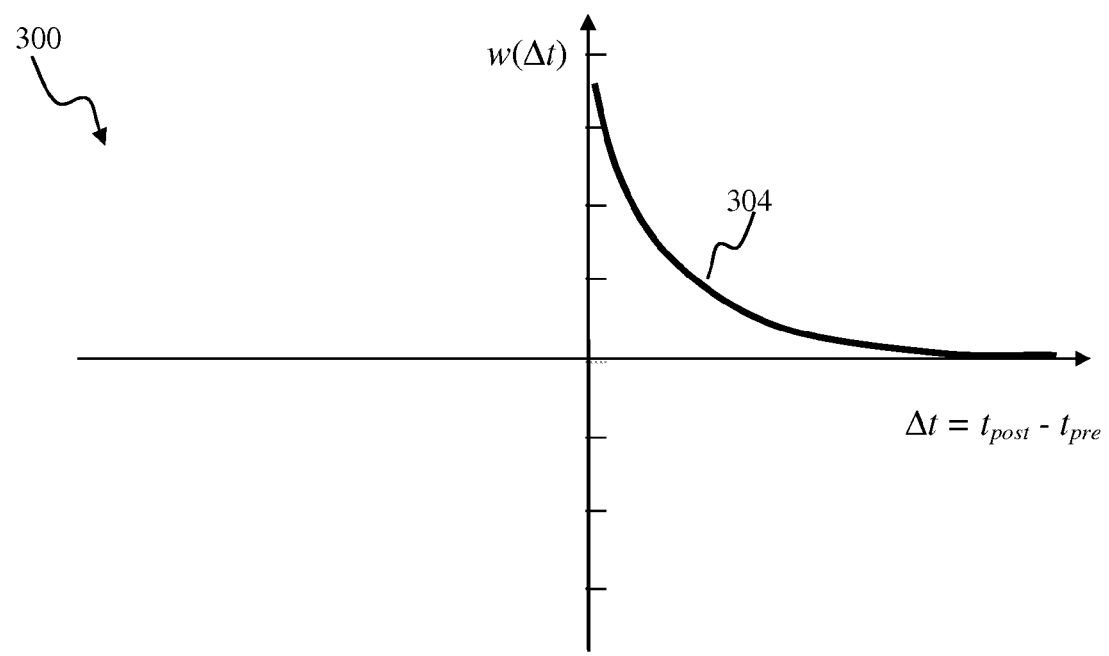
FIG. 3 is a plot depicting spike time dependent plasticity spike timing in the spiking network of FIG. 1, according to the prior art.

The learning block 420 may comprise learning framework according to the implementation described in co-pending and co-owned owned U.S. patent application Ser. No. 13/487,533 entitled "STOCHASTIC SPIKING NETWORK LEARNING APPARATUS AND METHODS", filed Jun. 4, 2012, that enables generalized learning methods without relying on calculations of the performance function F derivative in order to solve unsupervised, supervised and/or reinforcement learning tasks. The block 420 may receive the input x and output y signals (denoted by the arrow 402_1, 408_1, respectively, in FIG. 2), as well as the state information q 405. In some implementations, such as those involving supervised and reinforcement learning, external teaching signal r may be provided to the block 420 as indicated by the arrow 404 in FIG. 4. The teaching signal may comprise, in some implementations, the desired motion trajectory, and/or reward and punishment signals from the external environment.

In one or more implementations the learning block 420 may optimize performance of the control system (e.g., the network 400 of FIG. 4) that is characterized by minimization of the average value of the performance function F(x,y,r) as described in detail below.

Optimization of performance of the control system (e.g., the network 430 of FIG. 4) may, in some implementations, be achieved via maximization of the average of the performance function, as described in detail for example, in a co-owned and co-pending U.S. patent application Ser. No. 13/560,902 entitled "APPARATUS AND METHODS FOR GENERALIZED STATE-DEPENDENT LEARNING IN SPIKING NEURON NETWORKS", filed Jul. 27, 2012, incorporated supra.

In one or more implementations, instantaneous probability density of the neuron producing a response may be determined using neuron membrane voltage u(t) for continuous time chosen as an exponential stochastic threshold:

$$\lambda(t)=\lambda_o e^{\kappa(u(t)-\theta)}, \qquad \text{(Eqn. 13)}$$

where:

u(t) is the membrane voltage of the neuron,

θ is the voltage threshold for generating a spike,

κ is the probabilistic parameter, and $\lambda_0$ is the basic (spontaneous) firing rate of the neuron.

For discrete time steps, an approximation for the probability $\Lambda(u(t)) \in (0,1]$ of firing in the current time step may be given by:

$$\Lambda(u(t))=1-e^{-\lambda(u(t))\Delta t}, \qquad \text{(Eqn. 14)}$$

where Δt is time step length.

In some implementations, a score function $$g_i \equiv \frac{\partial h(y|x)}{\partial w_i}$$

may be utilized in order to determine changes for individual spiking neuron parameters. If spiking patterns are viewed on finite interval length T as an input x and output y of the neuron, then the score function may take the following form:

$$g_i = \frac{\partial h(y_T|x_T)}{\partial w_i} = -\sum_{t_l \in y_T} \frac{1}{\lambda(t_l)} \frac{\partial \lambda(t_l)}{\partial w_i} + \int_T \frac{\partial \lambda(s)}{\partial w_i} ds., \qquad \text{(Eqn. 15)}$$

where time moments $t_l$ belong to neuron's output pattern $y_T$ (neuron generates spike at these time moments). If an output of the neuron at individual time moments may be considered (e.g., whether there is an output spike or not), then an instantaneous value of the score function may be calculated using a time derivative of the interval score function:

$$g_i = \frac{\partial h_{\Delta t}}{\partial w_i} = \frac{\partial \lambda}{\partial w_i}\left(1 - \Sigma_l \frac{1-\Lambda(t)}{\Lambda(t)} \delta_d(t-t_l)\right), \qquad \text{(Eqn. 16)}$$

where $t_l$ is the time of output spike, and $\delta_d(t)$ is the Kronecker delta.

In one or more implementations, the score function values for the stochastic Integrate-and-Fire neuron discrete time may be determined as follows:

$$g_i = \frac{\partial h_{\Delta t}(y(t)|x)}{\partial w_i} = \kappa\lambda(t)\sum_{t_j^i \in x^i} \alpha(t-t_j^i)\left(1 - \sum_{t^{out} \in y} \frac{\delta_d(t-t^{out})}{\Lambda(t)}\right)\Delta t, \qquad \text{(Eqn. 17)}$$

where:

$t^{out}$ denotes the output spike time instances;

α denotes the alpha-function; and $\delta_d(t)$ is the Kronecker delta.

State variables q (e.g., probability of firing λ(t)) associated with the control model may be provided to the learning block 420 via the pathway 405. The learning block 420 of the neuron 430 may receive the output spike train y(t) via the pathway 408_1.

In one or more implementations, the input interfaces (i.e., the connections 414 of the network 400 of FIG. 4) may be operated according a linear dynamic process that may be expressed as:

$$\frac{d\vec{S}_i(t)}{dt} + A(q,t,t^{out})\vec{S}_i(t) = \vec{k}_i \sum_j \delta(t-t_j^{in}) + \sum_{t^{out}} Rs(t)\delta(t-t^{out}), \text{ and} \qquad \text{(Eqn. 18)}$$

$$\frac{de_i(t)}{dt} + \frac{e_i(t)}{\tau} = Q(t)S_i(t). \qquad \text{(Eqn. 19)}$$

In one or more implementations, connection dynamic process may be described using stable dynamic equations (e.g., Eqn. 18, Eqn. 19) so that their respective solutions $S_i(t)$, $e_i(t)$ decay exponentially with time. Accordingly, such dynamic process, comprise exponentially decaying effects ('memory') of external influences (the right-hand side terms parts of Eqn. 18 and Eqn. 19 describing the input spikes and the term Q(t) $S_i(t)$, respectively) that may produce substantially diminished effects of external influences (e.g., spikes) on the synapse dynamics when these events occur sufficiently far in the past. The exponential decay thus allows characterization of synapse dynamics that may be based on inputs occurring within the time interval (t–T), where T may be determined based on the dynamics of the system (i.e., the matrix A in Eqn. 18 the time scale τ in Eqn. 19). By way of example, the time interval T may be configured equal to τ in one or more implementations, while in some implementations T may be determined as $T=1/\lambda_{max}$, where $\lambda_{max}$ is maximum real part of the eigenvalues the matrix A in Eqn. 18.

It is noteworthy that as Eqn. 18 and Eqn. 19 comprise linear differential equations, the superposition principle may be applied in order to obtain solutions $S_i(t)$ and $e_i(t)$, in one or more implementations. Specifically, the right-hand sides of Eqn. 18 may be decomposed into plurality of event-dependent connection change basis vectors $b_m(t)$, as described below with respect to Eqn. 20 and Eqn. 22; and the right-hand sides of Eqn. 19 may be decomposed into plurality of event-dependent connection change (EDCC) components $y_m(t)$, as described below with respect to Eqn. 25. Accordingly, using the superposition, the state response $S_i(t)$ of the $i^{th}$ connection to an input spike $s^{in}(t_m)$ within the interval (t–T) of the input spike train $\Sigma_j \delta(t-t_j^{in})$ may be determined as a linear combination of contributions of individual basis vectors associated with individual ones of $m^{th}$ spikes within the input spike train $s^{in}(t_m)$. Similarly, the eligibility trace $e_i(t)$ of the $i^{th}$ connection may be determined as a linear combination of contributions of individual EDCC components $y_m(t)$ associated with individual ones of $m^{th}$ spikes within the input spike train $s^{in}(t_m)$. In one implementation, the superposition may be effectuated using weighted linear combination, as described, for example, with respect to Eqn. 25. As described in detail below with respect to FIGS. 6-6B, the EDCC components may be pre-computed (once per neuron) and linearly combined in order to determine solutions of Eqn. 18, Eqn. 19 (e.g., $S_i(t)$ and $e_i(t)$) at the time of the update t for individual connections 414. In some implementations, the event-dependent connection change (EDCC) may comprise eligibility trace configured for adapting connection weights (e.g., synaptic weights).

Furthermore, in some implementations, the neuronal dynamic process (e.g., Eqn. 18 and Eqn. 19) may comprise non-stationary the matrix A and/or Q. Provided that the process is stable (i.e., the solution of Eqn. 18 and Eqn. 19 decays with time), these solutions at time $t_{up}$ may be obtained by evaluating the process state over the $(t_{up}-T)$ time interval. It is noteworthy that because of stability of equations, solution of homogeneous equations (where right-hand side is zero) decays to zero. A sufficiently large time interval T, compared to the time decay scale of Eqn. 18, Eqn. 19, may correspond, in some implementations, to zero initial conditions of Eqn. 18 and Eqn. 19.

It will be appreciated by those skilled in the arts that neural network dynamics represented by Eqn. 18 and Eqn. 19 may comprise one implementation and the framework of the innovation is not so limited and may be utilized with any network synaptic dynamics that may be described using linear and stable process so that superposition principle may be used.

Event-Dependent Connection Change Component Determination

In one or more implementations, the event-dependent connection change basis vectors $b_m(t)$ may be determined using the following differential equation:

$$\frac{d\vec{b}_m(t)}{dt} + A(q, t, t^{out})\vec{b}_m(t) = \delta(t - m\Delta t) + \sum_{t^{out}} Rs(t)\delta(t - t^{out}),$$ (Eqn. 20)

where:
$\vec{b}_m(t)$ comprises the event-dependent connection change component basis vector;
$\Delta t$ is a state update time step; and
m is basis vector index selected in the range from 0 to $nT=T/\Delta t$.

Without loss of generality, zero initial condition $db_m/dt=0$ at $t=0$ may be used, in one implementation, with the description of Eqn. 20. In one or more implementations, the dimension of the basis vector $\vec{b}_m(t)$ may be selected to match the dimension of the estate vector $S_i(t)$ in Eqn. 18.

As shown by Eqn. 20, the vectors $b_m$ no longer depend on the input spike history (i.e., the spike train $\Sigma_j \delta(t-t_j^{in})$). Accordingly, solution of Eqn. 20 may be determined for the neuron as a whole (i.e., neuron and all its plurality of connections, in one or more implementations) as opposed to prior art methodologies that rely on calculating Eqn. 7 for individual connection synapses of the neuron, independently from one another.

In one or more implementations, Eqn. 20 may be solved using Euler integration techniques, for example as:

$$b_0(t)=0, b_{m+1}(t)=b_m(t)-\Delta t\, A\, b_m(t)+\Sigma_{t^{out}} Rs(t)\delta(t-t^{out}).$$ (Eqn. 21)

Each equation in a form of Eqn. 20 with specific index m may describe a solution of the connection state vector $S_i(t)$ as if only one input spike occurred at time $t_m=t-m\Delta t$. In accordance with the superposition principle, solution of Eqn. 18 may be found as a linear combination of the components $\vec{b}_m(t)$, determined, for example, from Eqn. 20, as follows:

$$\vec{S}_i(t)=\text{diag}(\vec{k}_i)\Sigma_{m:t_j^{in}=t-m\Delta t}\vec{b}_m(t),$$ (Eqn. 22)

where $\text{diag}(\vec{k}_i)$ is a diagonal matrix with entries that equal to $\vec{k}_i$ elements. In some implementations, the indices m in the summation of Eqn. 22 may comprise the input spikes associated with i-th synapse (i.e., the spikes that occurred at the time steps that correspond to m-th solution of Eqn. 12), as described in detail below with respect to FIG. 6.

In one or more implementations, applicable for example to discrete time learning processes in spiking neuron networks, the solution of Eqn. 19 may be determined by expressing the right-hand side term using Eqn. 22 as follows:

$$Q(t)S_{ik}(t)=Q(t)k_i\Sigma_{m:\, t_j^{in}=t-m\Delta t}\vec{b}_{mk}(t).$$ (Eqn. 23)

In one or more implementations, dynamics basis of the eligibility trace $e_i$ state variables may be expresses using the following differential equation:

$$\frac{d y_m(t)}{dt} + \frac{y_m(t)}{\tau} = Q(t)\vec{b}_{mk}(t),$$ (Eqn. 24)

where:
$y_m(t)$ is the eligibility trace basis state variable;
m is the index in the range from 0 to nT; and
$\vec{b}_{mk}(t)$ is the connection state vector (e.g., the solution of Eqn. 20) described supra.

Assuming zero initial conditions, solution of Eqn. 24 may be determined using, for example, Euler integration, similar to that described by Eqn. 21. The eligibility traces $e_i(t)$ may then be determined using the superposition principle as a linear combination of the eligibility trace basis state variables as:

$$e_i(t)=k_i\Sigma_{m:\, t_j^{in}=t-m\Delta t}y_m(t).$$ (Eqn. 25)

The indices m in the summation of Eqn. 25 may be configured such that to correspond to input spikes in i-th synapse (spikes that occurred at the time steps that correspond to m-th solution of eq. 11), as described in detail below with respect to FIG. 6.

Efficient Synaptic Updates

Figure 5:
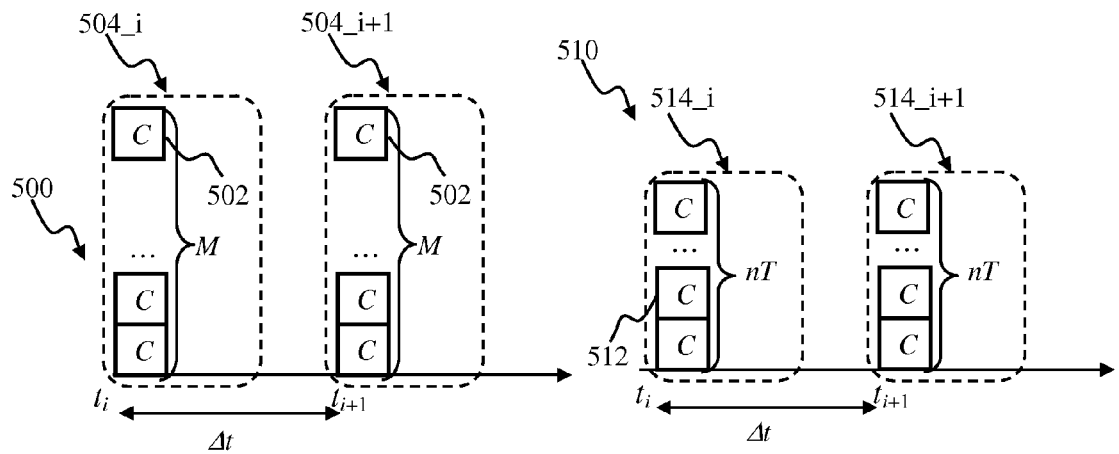
FIG. 5 is a graphical illustration depicting computational transactions associated with synaptic updates of the neural network of FIG. 4, in accordance with one or more implementations.
Figure 6:
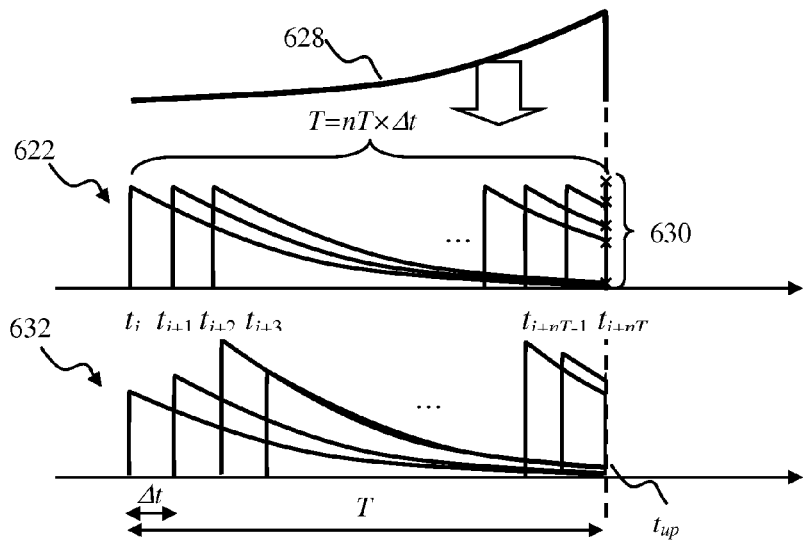
FIG. 6 is a plot illustrating event-dependent connection change component decomposition computations associated with efficient synaptic updates of FIG. 5, in accordance with one or more implementations.

Referring now to FIGS. 6-6A, efficient synaptic updates of a neuron in a spiking neural network (e.g. the network 400 of FIG. 4) are shown and described in accordance with one or more implementations. FIG. 5 illustrates computation periodicity and load for a typical update methodology of the prior art (the panel 500) and efficient update methodology of the disclosure (the panel 510). The methodology of the prior art may comprise one or more updates 504_i, 504_i+1, occurring at times $t_i$, $t_{i+1}$, respectively, that may be separated by the network update interval $\Delta t$. Individual updates 504 of the prior art may comprise M×C computations, where M is the number of synaptic connections (e.g., the connections 414) per neuron (the neuron 430 of FIG. 4), and the block 502 may correspond to single connection update, comprising C computations per connection/per update. In some implementations, the connection update 502 may be configured in accordance with the connection dynamic process and/or neuron dynamic process.

Contrast the updates shown in the panel 500 with the efficient updates, of the disclosure illustrated in the panel 610. In accordance with one implementation, the efficient updates comprise one or more updates 614_i, 614_i+1, occurring at times $t_i$, $t_{i+1}$, respectively, that may be separated by the network update interval $\Delta t$. Individual updates 614 may comprise $nT \times C$, computations, where $nT=T/\Delta t$ is the number of EDCC components that may be computed per update as described in detail supra, and C is the number of computations per EDCC component 612, illustrated in FIG. 5 below. When nT<M the updates 614, effectuated in accordance with one or more implementations, advantageously reduce computational and memory load associated with synaptic updates in a neural network.

FIG. 6 illustrates one or more implementations of the EDCC components of the disclosure. The curve group 622 depict time evolution of EDCC component traces. In some implementations, (e.g., the implementation illustrated by the curve group 622 in FIG. 6) the maximum magnitude of EDCC component may change with time. In one or more implementations, the decay time scale T may be configured different for different EDCC components. In some implementations, the decay time scale T may be configured the same for all components, as illustrated by the curve group 622. In FIG. 6, the time instance $t_{i+nT}$ corresponds to the present time ($t_{up}$), the curves 622 may be separated from one another by a time increment $\Delta t$, so that the total number of curves is $nT=T/\Delta t$, in one or more implementations.

In some implementations, the EDCC component traces may comprise time-varying maximum magnitude of plasticity changes, such as, for example when the neuronal dynamics term Q(t) of Eqn. 19 is time-varying, as illustrated by the curve group 632 in FIG. 6A.

As describe above with respect to Eqn. 18 and Eqn. 19, individual EDCC components may describe contribution to overall synaptic plasticity adjustment at time $t_{up}$ due to one or more events that occurred within the time interval ($t_{up}-T$). Because the EDCC components 622, 632 decay with time, contribution of individual EDCC components $b_m$ (corresponding to the time instance $t_i = t_{up} - i\, \Delta t$) to the overall plasticity adjustment at time $t_{up}$ progressively diminishes, as the age of the component (i.e., the difference $t_{up} - i\, \Delta t$) grows larger. The overall effect of this ageing contribution discount may be expressed, in one or more implementations, by a decaying weighting shown by line 628 in FIG. 6. Accordingly, at time $t_{up}$, contributions associated with the STDP components $b_m$ are illustrated by the ×symbols 630 in FIG. 6. One realization of the age-based discount rate is provided in Table 1, where nT=20, and the discount Di corresponds to the discounted magnitude of the component $b_m$ at time $t_{up} = t_{nT}$.

TABLE 1

| i | Di |
|---|---|
| 1 | 2 |
| 2 | 3 |
| 3 | 3 |
| ... | |
| nT − 2 | 67 |
| nT − 1 | 82 |
| nT | 100 |

Event-Based Updates

Efficient synaptic updates described herein may be effectuated based on one or more of the following events:
 (i) global network update occurring at regular intervals (e.g., $\Delta t$);
 (ii) local neuron update occurring based on a timer;
 (iii) local neuron update occurring based on the neuron generating response (spike);
 (iv) local neuron update occurring based on the neuron receiving a feed-forward input (spike);
 (v) local neuron update occurring based on the neuron receiving a lateral and/or feedback input (spike);
 (vi) global/local update occurring based on a trigger. In one or more implementations, the trigger may comprise buffer overflow signal associated with a memory buffed configured to store input activity for a neuron, as described for example in a co-pending and co-owned U.S. patent application Ser. No. 13/239,255 filed Sep. 21, 2011, entitled "APPARATUS AND METHODS FOR SYNAPTIC UPDATE IN A PULSE-CODED NETWORK", incorporated herein by reference in its entirety.
 (vii) reward signal associated with reinforcement-based network learning performance as described, for example, in a co-pending and co-owned U.S. patent application Ser. No. 13/489,280 entitled "APPARATUS AND METHODS FOR REINFORCEMENT LEARNING IN ARTIFICIAL NEURAL NETWORKS", filed Jun. 5, 2012, incorporated supra.

Figure 7:
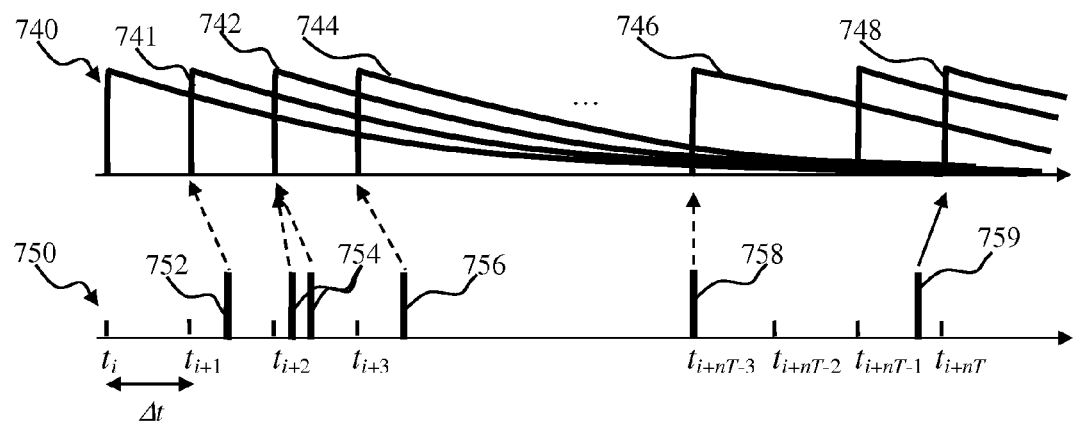
FIG. 7 is a plot illustrating interrelation of update events and event-dependent connection change component decomposition of efficient synaptic updates of FIG. 5, in accordance with one or more implementations.
Figure 8:
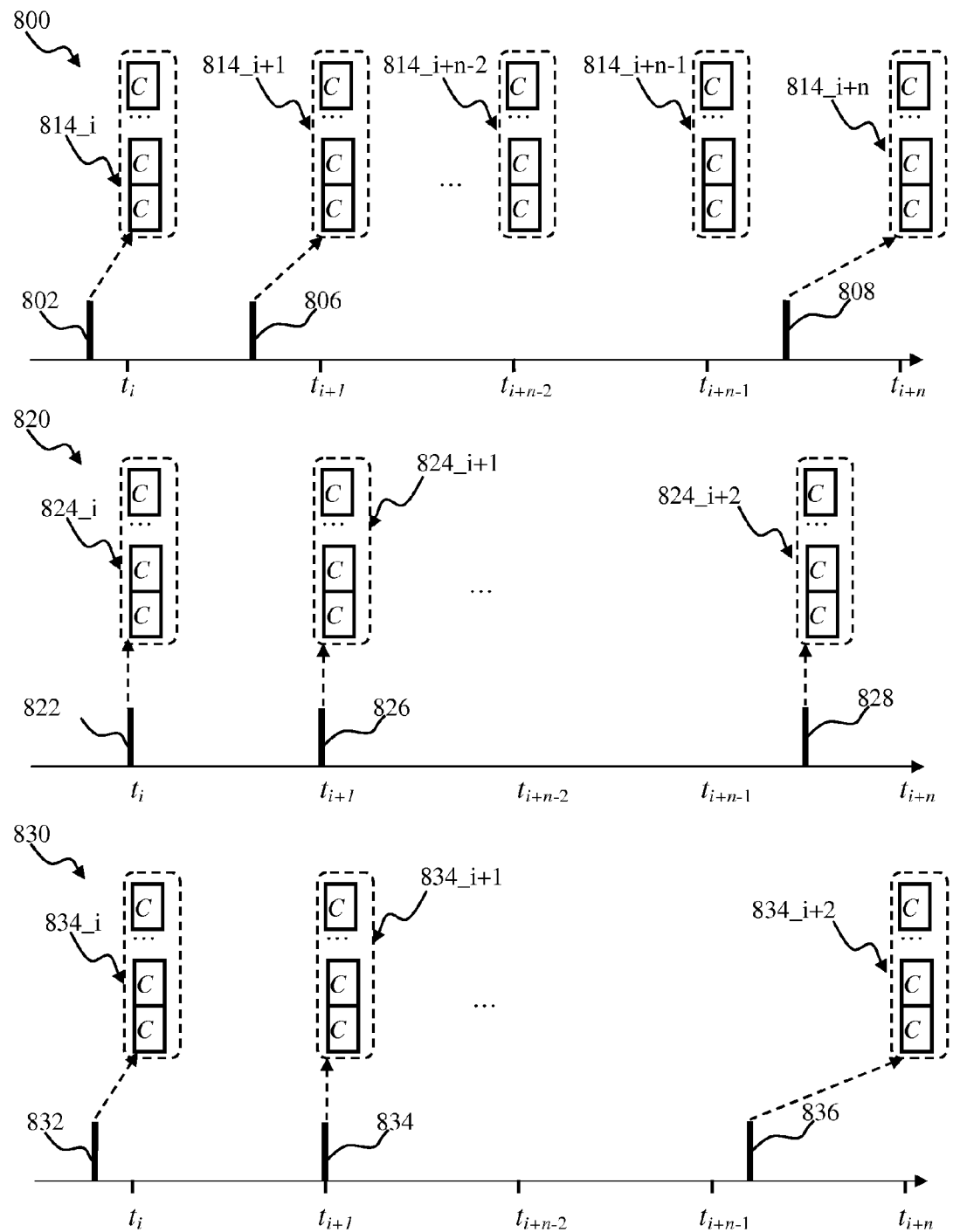
FIG. 8 is a graphical illustration depicting on-demand and cyclic computation of event-dependent connection change component decomposition of efficient synaptic updates of FIG. 6, in accordance with one or more implementations.

FIGS. 7-8 illustrate timing of the updates and EDCC component selection in accordance with one or more implementations. The panel 740 in FIG. 7 presents a sequence of EDCC components 741, 742, 744, 746, 748, such as, for example, described above with respect to Eqn. 20 and FIG. 6. The panel 750 in FIG. 7 illustrates event sequence, comprising for example, neuron inputs 752, 754, 756, 758, 759 (such as feed-forward input and/or a reinforcement spikes). In one implementation, (not shown) the event clock and the EDCC components computation clock may be synchronized and selected to be updated at regular network update intervals, for example 1 ms intervals. In the implementation shown in FIG. 7, the event clock and the EDCC computation clock is not synchronized, as illustrated, for example, by timing mismatch between the events 752 and the plasticity component 741. Accordingly, when performing updates, the most recent EDCC component may be selected for individual events, as shown by the dashed arrows in FIG. 7. Table 2 presents one such realization, where the first column list the time stamp of events (e.g., the events 750 of FIG. 7), the second column denotes the time of the most recent EDCC component, and the third and the fourth columns contain the component index i and the EDCC component (e.g., the component 740 of FIG. 7) used to compute the contribution of the event to the overall plasticity update. In one or more implementations, the component may correspond to the discounted EDCC contribution illustrated by the x-symbols 630 in FIG. 5. It is noteworthy implementation illustrated in Table 2 corresponds to a time-invariant synaptic connection dynamics (i.e., Q(t)=const. in Eqn. 19). Accordingly, in such realizations, the update may be effectuated by computing a single look up table (LUT) at the beginning of the network operation, and using the index i to obtain appropriate plasticity contribution. In such implementations, the overall processing load associated with the updates may be reduced even further, compared to the prior art.

TABLE 2

| T event | T update | EDCC index i | Di |
|---|---|---|---|
| 2 | 5 | 1 | 2 |
| 8 | 10 | 2 | 6 |
| 10 | 10 | 2 | 14 |
| 14 | 15 | 3 | 25 |

TABLE 2-continued

| T event | T update | EDCC index i | Di |
|---|---|---|---|
| 19 | 20 | 4 | 55 |
| 21 | 25 | 5 | 100 |

In some implementations, effectuating time-varying connection dynamics, the update LUT (e.g., Table 2) may be evaluated for individual updates. In some implementations, the time-varying synapse dynamics may be partitioned into one or more segments, where the dynamics may be approximated as a semi-stationary, so that a single LUT (e.g., Table 2) may be computer per such segment.

As described above, in order to implement effective plasticity updates in accordance with the present disclosure for a time-varying connection dynamics, at individual update instances an array of the plasticity EDCC traces may be computed so that the update LUT may be constructed. In some implementations, the LUT computations may be effectuated at individual network update steps (e.g., the Δt interval), as shown by the panel 800 in FIG. 8, where the updates 814 may be performed at individual time steps t, also referred to as the cyclic update. As seen from the panel 800, there may be only three the events 802, 806, 808 that may require performing synaptic updates 814. Hence, some of the computational resources may be wasted when updates (e.g., the updates 814 at time instances $t_{i+n-2}$, $t_{i+n-1}$) may be performed in the absence of the associated event.

In some implementations, configured to reduce computational load associated with updates, the updates (also referred to as the on-demand updates) may only be performed based on an event, as illustrated by panels 820, 830 n FIG. 8. The panel 820 illustrates immediate on-demand updates, where the updates 824 may be performed right after the detection of the event 822, 826, 828.

The panel 830 illustrates delayed synchronous on-demand updates, where the updates 834 may be synchronized to a clock (e.g., local neuron clock or global network clock) and performed at the next following clock instance. By way of illustration in FIG. 8, the update 834_i, associated with the event 834, may be performed at the clock instance $t_{i+1}$, and the update 834_i+2, associated with the event 836, may be performed at the clock instance $t_{i+n-1}$.

TABLE 3

| Event # | T event (ms) | T synchronous update (ms) | T immediate update (ms) |
|---|---|---|---|
| 1 | 1.8 | 2 | 1.8 |
| 2 | 8.9 | 10 | 8.9 |
| 3 | 9.7 | 10 | 9.7 |
| 4 | 20 | 20 | 20 |
| 5 | 42.5 | 44 | 42.5 |
| 6 | 49.0 | 50 | 49.0 |
| 7 | 51.0 | 52 | 51.0 |

Table 3 illustrates timing of on-demand updates in accordance with one or more implementations. The network updates corresponding to Table 3 occur at 2 ms increments, and the time resolution may be selected at 0.1 ms. It will be recognized by those skilled in the arts that these parameters are exemplary and any applicable network update rate and/or clock resolution may be used in other implementations. The first column in Table 3 contains the event number; the second column shows the time stamp of the events (i.e., reinforcement signal, input spike, etc.). The third column contains time of synchronous on-demand updates which occur at the next network update cycle. It is noteworthy, that because of a finite update periodicity resolution (e.g., 2-ms) some of the updates (i.e., the updates 1-3, 5-7) may be delayed until the next update cycle. Furthermore, two or more events (e.g., the events 2-3 in Table 3) may be effectuated at the same time (e.g., at 10 ms step), potentially reducing the computational load on the network apparatus. the same updates The fourth column contains time of immediate on-demand updates which occur immediately upon the detection of the event. It is noteworthy, that in such immediate update implementation, individual events may cause a separate update.

Modulated STDP

In one or more implementations, the EDCC components may comprise one or more eligibility trace configured for implementing synaptic plasticity, such as, for example, adapting weights of synaptic connections. In one such implementation described in detail in U.S. Pat. No. 8,103,602, entitled "SOLVING THE DISTAL REWARD PROBLEM THROUGH LINKAGE OF STDP AND DOPAMINE SIGNALING" filed Dec. 21, 2007, the plasticity mechanism, useful with the efficient update methodology of the present disclosure, may comprise STDP that is modulated by an additional parameter. In some implementations, the parameter may be configured as specific to individual neurons. In one or more implementations, the parameter may be configured network-wide, such as for example, when simulating reward actions of biological neurotransmitter dopamine.

In some implementations of the modulated STDP process (e.g., Eqn. 7-Eqn. 8) may be expressed using the following framework:

a one dimensional synapse state vector $\vec{S}_i(t) = S_i(t)$;
synaptic coefficient vector $k_i = 1$;
one-dimensional matrix $$A(q, t, t^{out}) = \frac{1}{\tau_s}$$

that does not depend on input and/or output activity and is time invariant, where $\tau_s$ is STDP time constant (typically 30-100 ms);

synapse reset condition after post-synaptic spike $Rs(t) = -S_i(t)$;

function of a state of the neuron $Q(t) = \Sigma_{t^{out}} \delta(t - t^{out})$;

$$\frac{dS_i(t)}{dt} = -\frac{1}{\tau_s} S_i(t) + \sum_j \delta(t - t_j^{in}) - \sum_{t^{out}} S_i(t) \delta(t - t^{out}) \quad \text{(Eqn. 26)}$$

$$\frac{de_i(t)}{dt} = -\frac{e_i}{\tau} + S_i(t) \sum_{t^{out}} \delta(t - t^{out}) \quad \text{(Eqn. 27)}$$

where:
$\tau$ is an eligibility trace time constant (typically 50-500 ms),
$S_{ik}(t)$ is a k-th element in the synaptic state vector $\vec{S}_i$.

In some implementations, the basis vectors $\vec{b}_m(t)$ may be expressed using exponents referenced to the time of presynaptic spike $t - m \times \Delta t$:

$$\vec{b}_m(t) = H(t - m\Delta t)e^{-(t - m\Delta t)/\tau_s}. \quad \text{(Eqn. 28)}$$

As seen from Eqn. 28, the component vectors $\vec{b}_m(t)$ do not depend on the input and/or output spike time. Accordingly, the vector traces $\vec{b}_m(t)$ may be pre-computed, in one or more implementations, in advance of neuron network operation. In some implementations, the computational load associated with executing updates of a spiking neuron network may be further reduced by using these pre-computed during the duration of network operation in lieu of re-computing the components at a time of the update is to be performed In one or more implementations, synaptic connection weight changes may be based on an additional spiking signal D(t) as follows:

$$\frac{dw_i}{dt} = \delta(t - t^r) * e_i, \quad \text{(Eqn. 29)}$$

where $t^r$ is the arrival time associates with spikes of D(t). In some implementations, the signal D(t) may be used to implement reward-based learning.

State-Dependent Eligibility Traces for Stochastic SRP Neuron

In one or more implementations, EDCC components may comprise one or more eligibility trace configured for implementing connection updates, such as, for example, adapting weights of synaptic connections. In one or more implementations of a stochastic neuron operable according to a spike-response process (SRP), the eligibility trace may be configured as dependent on a state of the connection at the time of the respective event (e.g., the input spike).

In one such implementation, the update process (e.g., Eqn. 7-Eqn. 8) may be expressed using the following framework:

two dimensional synapse state vector $\vec{S}_i(t) = \{S_i(t), x_i(t)\}$;

$\vec{k}_i = \{0, 1\}$;

time and activity independent two-dimensional matrix, expressed as:

$$A(q, t, t^{out}) = \left[\left\{\frac{1}{\tau_{s1}}, -1\right\}; \left\{0, \frac{1}{\tau_{s2}}\right\}\right]; \quad \text{(Eqn. 30)}$$

reset of synapse state to zero after individual post-synaptic spikes, expressed as $Rs(t) = -\vec{S}_i(t)$; and function of a state of the neuron in discrete time (e.g., Eqn. 17), expressed as:

$$Q(t) = K\lambda(t)\left(1 - \sum_{t^{out}} \frac{\delta(t - t^{out})}{\Lambda(t)}\right)\Delta t. \quad \text{(Eqn. 31)}$$

Accordingly, the update process may be characterized as follows:

$$\frac{dS_i(t)}{dt} = -\frac{1}{\tau_{s1}} S_i(t) + x_i(t) - \sum_{t^{out}} S_i(t) \delta(t - t^{out}), \quad \text{(Eqn. 32)}$$

$$\frac{dx_i(t)}{dt} = -\frac{1}{\tau_{s2}} x_i(t) + \sum_j \delta(t - t_j^{in}) - \sum_{t^{out}} x_i(t) \delta(t - t^{out}), \quad \text{(Eqn. 33)}$$

and $$\frac{de_i(t)}{dt} = -\frac{e_i(t)}{\tau} + S_i(t) Q(t), \quad \text{(Eqn. 34)}$$

where:

$\tau_S$ is a STDP time constant (typically 30-100 ms), $\tau$ is an eligibility trace time constant (typically 50-500 ms), and $S_{ik}(t)$ is a k-th element in the synaptic state vector $\vec{S}_i$.

In one or more implementations, weights changes may be configured based on an additional signal F(t) as follows:

$$\frac{dw_i}{dt} = F(t) e_i, \quad \text{(Eqn. 35)}$$

where F(t) is the performance function associated with the learning process effectuated by the neuron network updates. In one or more implementations, learning may be effectuated by minimizing the performance function F(t), as described for example in a co-owned and co-pending U.S. patent application Ser. No. 13/487,499, entitled "STOCHASTIC APPARATUS AND METHODS FOR IMPLEMENTING GENERALIZED LEARNING RULES" filed Jun. 4, 2012, incorporated herein by reference in its entirety.

In some implementations, the efficient update methodology described herein may be effectuated using high level neuromorphic language description (HLND) described in detail in co-pending and co-owned U.S. patent application Ser. No. 13/385,938 entitled "TAG-BASED APPARATUS AND METHODS FOR NEURAL NETWORKS" filed on Mar. 15, 2012, incorporated herein by reference in its entirety. One exemplary HLND script is provided below and configured to effectuate state-dependent eligibility trace for use, for example with methods of FIGS. 9A-9D described supra.

Eligibility Traces with Non-Associative LTP Term

In one or more implementations, EDCC components may comprise one or more eligibility trace configured for implementing non associative connection updates, such as, for example, adapting weights of synaptic connections, comprising long term connection depression (LTD).

In one such implementation, the update process (e.g., Eqn. 7-Eqn. 8) may be expressed using the following framework:

one dimensional synapse state vector $\vec{S}(t) = S_i(t)$;

$k_i = 1$;

time and activity independent one-dimensional matrix, expressed as $$A(q, t, t^{out}) = \frac{1}{\tau_s};$$

reset of synapse state to zero after individual post-synaptic spikes $Rs(t) = -S_i(t)$; and neuron state process, expressed as:

$$Q(t) = -\sum_{t^{out}} \delta(t - t^{out}) + P, \quad \text{(Eqn. 36)}$$

$$\frac{dS_i(t)}{dt} = -\frac{1}{\tau_s} S_i(t) + \sum_j \delta(t - t_j^{in}) - \sum_{t^{out}} S_i(t) \delta(t - t^{out}), \quad \text{(Eqn. 37)}$$

and $$\frac{de_i(t)}{dt} = -\frac{e_i(t)}{\tau} + S_i(t)\left(\sum_{t^{out}} \delta(t - t^{out}) - P\right), \quad \text{(Eqn. 38)}$$

where:
 $\tau_S$ is a STDP time constant (typically 30-100 ms),
 $\tau$ is an eligibility trace time constant (typically 50-500 ms),
 $S_{ik}(t)$ is a k-th element in the synaptic state vector $\vec{S}_i$, and
 P is a non-associative LTP (for e.g., non-associative potentiation of weights that received input spikes).

In some implementations, the basis vectors $\vec{b}_m(t)$ may be expressed using exponents referenced to the time of presynaptic spike t−m×Δt:

$$\vec{b}_m(t) = H(t - m\Delta t)e^{-(t - m\Delta t)/\tau_S}. \quad \text{(Eqn. 39)}$$

As seen from Eqn. 39, the component vectors $\vec{b}_m(t)$ do not depend on the input and/or output spike time. Accordingly, the vector traces $\vec{b}_m(t)$ may be pre-computed, in one or more implementations, in advance of neuron network operation. In some implementations, the computational load associated with executing updates of a spiking neuron network may be further reduced by using these pre-computed during the duration of network operation in lieu of re-computing the components at a time of the update is to be performed.

In one or more implementations, weight changes may be effectuated by an additional spiking signal:

$$\frac{dw_i}{dt} = \delta(t - t^r)e_i, \quad \text{(Eqn. 40)}$$

where $t^r$ time of arrival of the additional signal spikes.

STDP Traces with Exploratory Term from the Recent Patent

In one or more implementations, EDCC components may comprise one or more eligibility trace configured for implementing reward-based exploration during reinforcement learning. In one or more implementations, the exploration may comprise potentiation of inactive neurons, as described for example a co-owned U.S. patent application Ser. No. 13/489,280 entitled "APPARATUS AND METHODS FOR REINFORCEMENT LEARNING IN ARTIFICIAL NEURAL NETWORKS", filed Jun. 5, 2012, incorporated supra.

one dimensional synapse state vector $\vec{S}_i(t) = S_i(t)$;
 $k_i = 1$;
 time and activity independent one-dimensional matrix $$A(q, t, t^{out}) = \frac{1}{\tau_s};$$

reset of synapse state to zero after individual post-synaptic spikes, expressed as $Rs(t) = -S_i(t)$;
 function of a state of the neuron:

$$Q(t) = -\sum_{t^{out}} \delta(t - t^{out}) + P * H(-R(t)),$$

$$\frac{dS_i(t)}{dt} = -\frac{1}{\tau_s} S_i(t) + \sum_j \delta(t - t_j^{in}) - \sum_{t^{out}} S_i(t)\delta(t - t^{out}),$$

and $$\frac{de_i(t)}{dt} = -\frac{e_i(t)}{\tau} + S_i(t)Q(t),$$

where:
 $\tau_s$ is a STDP time constant (typically 30-100 ms),
 $\tau$ is an eligibility trace time constant (typically 50-500 ms),
 $S_{ik}(t)$ is a k-th element in the synaptic state vector $\vec{S}_i$,
 P describes non-associative LTD (for e.g., non-associative depression of weights that received input spikes), and
 H(x) is a Heaviside step function that is equals to 1 if argument is positive, 0 otherwise.

In some implementations, the basis vectors $\vec{b}_m(t)$ may be expressed using exponents referenced to the time of presynaptic spike t−m×Δt:

$$\vec{b}_m(t) = H(t - m\Delta t)e^{-(t - m\Delta t)/\tau_S}. \quad \text{(Eqn. 41)}$$

As seen from Eqn. 39, the component vectors $\vec{b}_m(t)$ do not depend on the input and/or output spike time. Accordingly, the vector traces $\vec{b}_m(t)$ may be pre-computed, in one or more implementations, in advance of neuron network operation. In some implementations, the computational load associated with executing updates of a spiking neuron network may be further reduced by using these pre-computed during the duration of network operation in lieu of re-computing the components at a time of the update is to be performed.

In one or more implementations, weights changes may be configured based on an additional signal R(t) as follows:

$$\frac{dw_i}{dt} = R(t)e_i, \quad \text{(Eqn. 42)}$$

where R(t) is the reinforcement (e.g., reward and/or punishment) signal associated with the learning process effectuated by the neuron network updates. In one or more implementations, learning may be effectuated by selectively potentiating inactive neurons in accordance with the reinforcement signal, as described for example in a co-owned and co-co-owned U.S. patent application Ser. No. 13/489,280 entitled "APPARATUS AND METHODS FOR REINFORCEMENT LEARNING IN ARTIFICIAL NEURAL NETWORKS", filed Jun. 5, 2012, incorporated supra.

Exemplary Methods

FIGS. 9A-9E illustrate methods of efficient connection updates for a neuron of a neural network in accordance with one or more implementations. The operations of methods 900, 920, 930, 940, 950 presented below may be intended to be illustrative. In some embodiments, methods 900, 920, 930, 940, 950 may be accomplished with one or more additional operations not described, and/or without one or more of the operations discussed. Additionally, the order in which the operations of methods 900, 920, 930, 940, 950 are illustrated in FIGS. 9A-9E and described below is not intended to be limiting.

In some embodiments, methods of FIGS. 9A-9E may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 900, 920, 930, 940, 950 in response to instructions stored electronically on an electronic storage medium. The one or more processing devices may include one or more devices configured through hardware, firmware, and/or software to be specifically designed for execution of one or more of the operations of method 900, 920, 930, 940, 950.

Figure 9A:
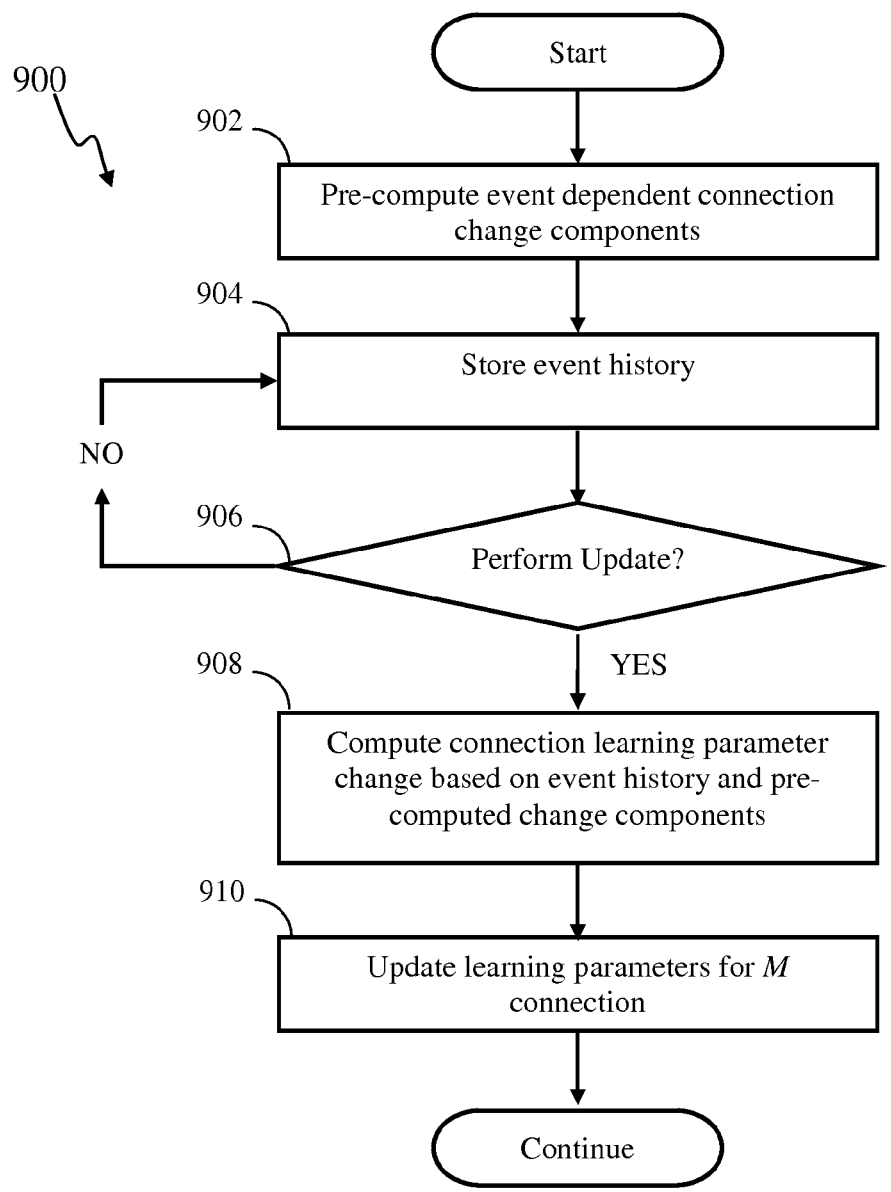
FIG. 9A is a logical flow diagram illustrating efficient update method, comprising time invariant connection dynamics, for use with neural network of FIG. 4, in accordance with one or more implementations.

Referring now to FIG. 9A one such implementation of the efficient update method for use with time-invariant connection dynamic state is described in detail.

At step 902 of method 900 the connection activity may be monitored and history of inputs may be stored. Various implementations of history record are described with respect to step 922 of method 920 of FIG. 9B infra.

At step 904, an update indication may be checked in order to determine if the update may be performed.

If update is to be performed, at step 906 the EDCC components $y_m(t)$ may be computed using any of the methodologies described above with respect, for example, to FIGS. 6-8. In some implementations, a local or global look up table (e.g. Table 2) may be used in lieu of computing the components $y_m(t)$.

At step 908, the connection parameter change (e.g., plasticity update) may be computed using for example Eqn. 25 and Eqn. 6.

At step 910 the learning parameters $\theta_{ij}$ of the neuron connections may be updated using ay of applicable methodologies.

Figure 9B:
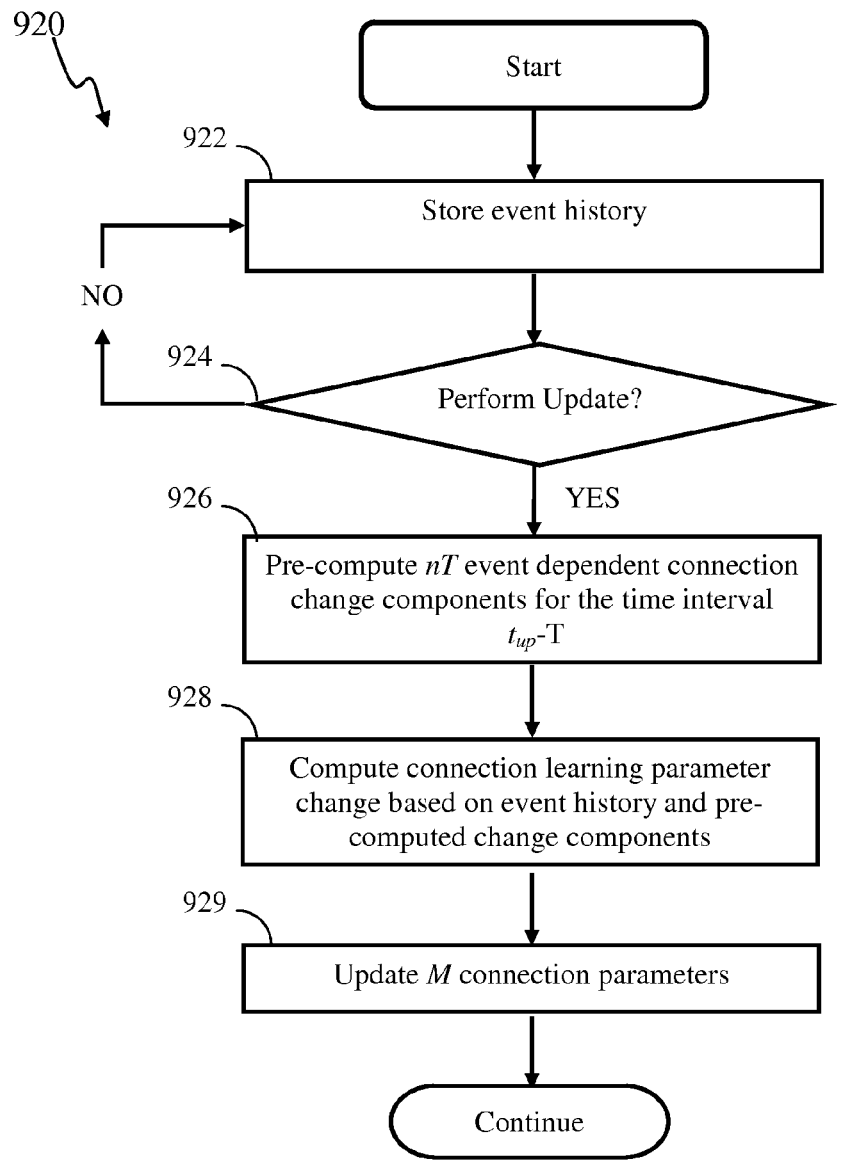
FIG. 9B is a logical flow diagram illustrating efficient update method, for use with network connections of FIG. 4, in accordance with one or more implementations.

Referring now to FIG. 9B one exemplary implementation of the efficient update method of the disclosure for use with, for example, the neuron 430 of FIG. 4 is described in detail. The method 920 of FIG. 9B may allow the neuron to: (i) implement cyclic updates; (ii) implement on demand updates (including synchronous on demand updates); update various learning parameters of neuron input connections, including but not limited to, connection delays, connection weights (e.g., short term and/or long term plasticity). Furthermore, the method 920 of FIG. 9B may be used to effectuate synaptic updates based on any of (i) input (e.g., feed-forward, and/or feedback, and/or lateral) activity; event trigger based updates due to e.g., external reinforcement signal, buffer overflow, a timer, etc.

At step 922 of method 920 the connection activity may be monitored and history of inputs may be stored. In some implementations, the history may comprise time stamp (e.g., a time counter value, a clock tick count, absolute or relative local time (either referenced to global network clock or to local node clock), etc.) associated with input spikes provided to the neuron via one or more connections (e.g., the connections 414 in FIG. 4). In one or more implementations, the input history record may comprise sending node ID. In one or more implementations, the input history record may comprise an index entries to a shared/local queue configured to store input spiking activity. In some implementations the history record may be stored in a circular memory buffer, such as described for example in a co-pending and co-owned U.S. patent application Ser. No. 13/239,255 filed Sep. 21, 2011, entitled "APPARATUS AND METHODS FOR SYNAPTIC UPDATE IN A PULSE-CODED NETWORK", incorporated supra. In such implementations, the buffer may comprise a plurality of bits (one bit per clock cycle) with values of zero and one indicating absence/presence of input spikes for a given clock cycle.

At step 924, an update indication may be checked in order to determine if the update may be performed. In some implementations, the indication may comprise next clock tick local/global clock used for network and/or neuron cyclic updates. In one or more implementations, the indication may comprise, but not limited to, any of the following events: external trigger, reinforcement signal, buffer overflow trigger/message event, a timer expiration, a response generated by the neuron (e.g., post synaptic update shown by the curve 544 in FIG. 5), an input communicated by one or more connections (e.g., pre-synaptic update shown by the curve 542 in FIG. 5), etc.

If update is to be performed, at step 926 the EDCC components $y_m(t)$ may be computed using any of the methodologies described above with respect, for example, to FIGS. 6-8. In some implementations, nT components may be computed to cover the time interval $(t_{up}-T)$ and use Eqn. 24.

At step 928, the connection parameter change (e.g., plasticity update) may be computed using for example Eqn. 25 and Eqn. 6.

At step 929 the learning parameters $\theta_{ij}$ of the neuron connections may be updated using any of applicable methodologies.

The method 920 shown and described with respect t to FIG. 9B may be used to, inter alia, implement updates of synaptic connection comprising time-dependent dynamics, as described for example by a time-dependent matrix A(t) in Eqn. 18 and illustrated by the panel 632 in FIG. 5.

In one or more implementations, the synaptic connection may comprising time-invariant state equation, so that solutions of Eqn. 18 at different time instances may be determined using a forward translation (propagation) of a single solution determined for time $(t_{up}-T)$ to times $(t_{up}-T+i\Delta t)$, as illustrated for example, by the curves in the panel 630 in FIG. 5. Accordingly, in such implementation, computations of event dependent connection change components for the time interval $(t_{up}-T)$, may be performed one per network operation (or run) and be used for all subsequent updates (within a time period where the time-invariance condition for the connection state variable S(t) holds), instead of being computed for every update as shown by the step 926 of method 920.

Figure 9C:
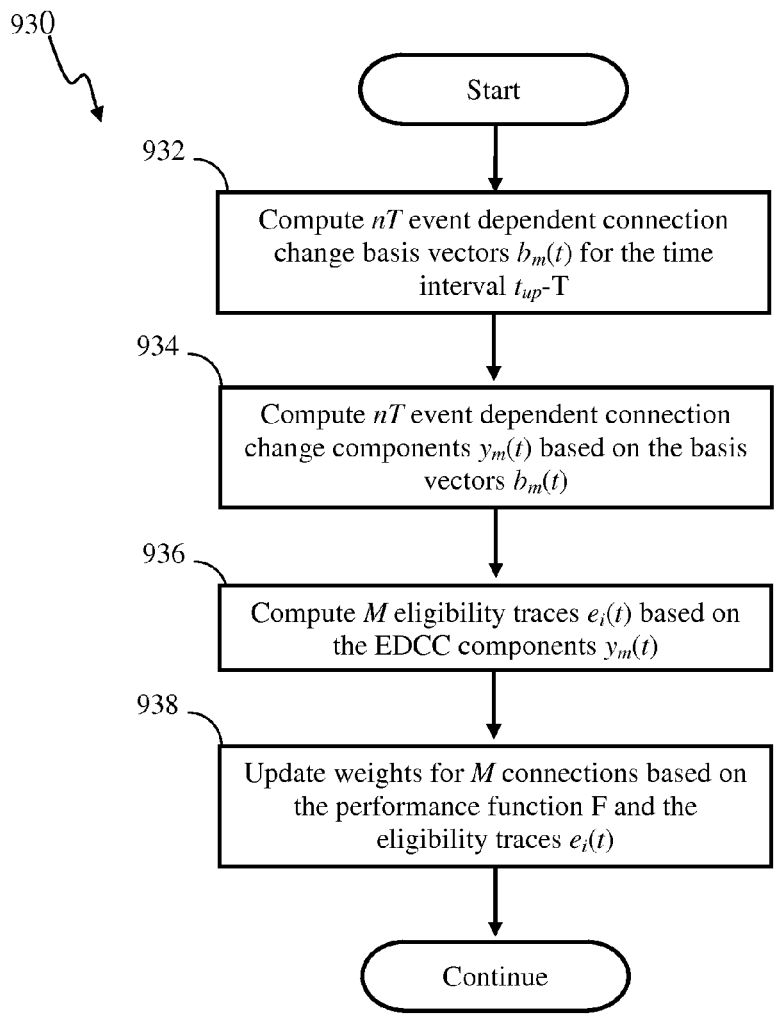
FIG. 9C is a logical flow diagram illustrating efficient update of synaptic weights, for use with neural network of FIG. 4, in accordance with one or more implementations.

FIG. 9C illustrates synaptic weights updates for use with methods illustrated in FIGS. 9A-9B, in accordance with one or more implementations.

At step 932 of method 930, a set of event-dependent connection change basis vectors $b_m(t)$ may be computed for the time interval $(t_{up}-T)$, as described above with respect to Eqn. 20 and Eqn. 22.

At step 934 the EDCC components $y_m(t)$ may be computed by, for example, using the basis vectors $b_m(t)$ and Euler's integration method with respect to Eqn. 24.

At step 936, the eligibility traces $e_{ij}(t)$ may be computed by, for example, using a linear combination of the EDCC components $y_m(t)$ as shown by Eqn. 25.

At step 938, the connection parameter $\theta_{ij}$ adjustment (e.g., plasticity update) may be computed using the eligibility traces and the performance function, as shown, for example, by Eqn. 6. In one or more implementations, the performance function may comprise a distance between the desired network output and the actual output, as described in detail in a co-pending and co-owned U.S. patent application Ser. No. 13/487,499 entitled "APPARATUS AND METHODS FOR IMPLEMENTING GENERALIZED STOCHASTIC LEARNING RULES", filed Jun. 4, 2012, incorporated supra.

Figure 9D:
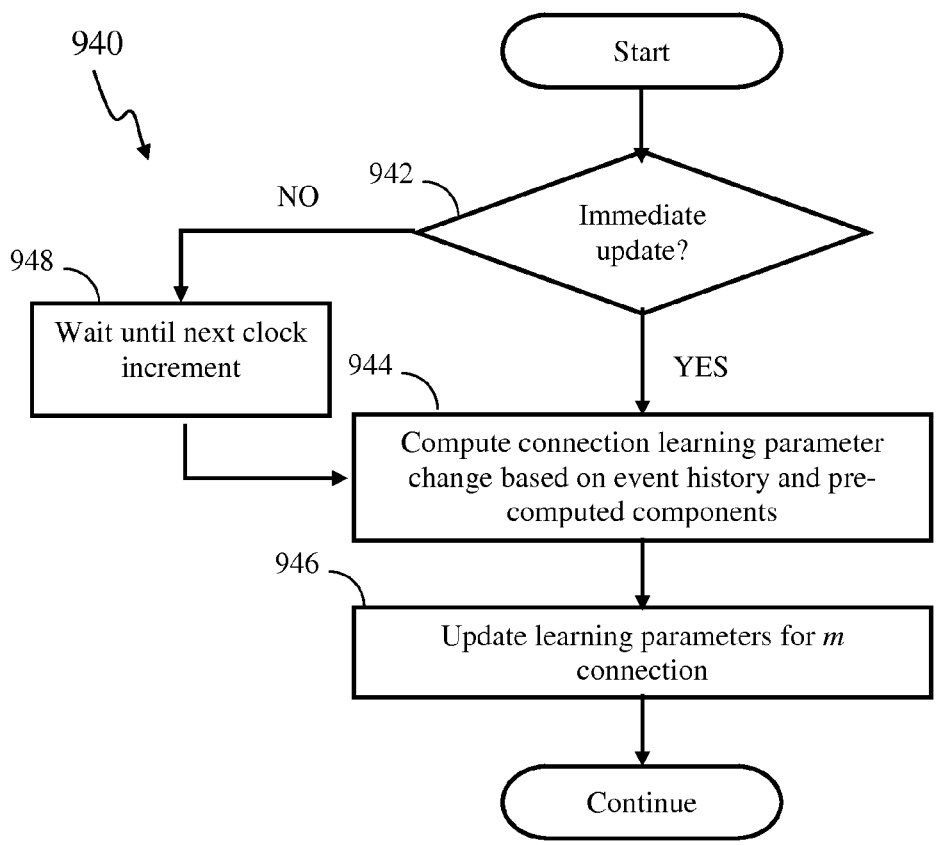
FIG. 9D is a logical flow diagram illustrating cyclic connection update method for use with the neural network of FIG. 4, in accordance with one or more implementations.

FIG. 9D illustrates efficient synchronous and immediate connection update for use with methods illustrated in FIGS. 9A-9C, and 9E, in accordance with one or more implementations.

At step 942 of method 940, a determination may be made if an immediate update is to be performed. In some implementations, the determination may comprise checking a flag (e.g., a flag, a logic state, a memory register, etc.).

If the immediate update is to be performed, the method 940 proceeds to steps 944, 946, where connection parameter adjustment may be computed, and learning parameters of M-connections may be adjusted using any of the applicable methodologies described herein, for example as shown by the panel 820 in FIG. 8, supra. In some implementations, the immediate update may comprise immediate on-demand update, such as in response to an event as described with respect to method 930 of FIG. 9C.

If the synchronous update is to be performed, the method 940 proceeds to step 948, where it waits until next clock increment. In some implementations, the synchronous update may comprise an on-demand update, such as in response to an event as described with respect to method 930 of FIG. 9C and illustrated, for example, by the panel 830 in FIG. 8 above. In one or more implementations, the synchronous update may comprise a cyclic update, such as in response to individual clock increments, as illustrated, for example, by the panel 800 in FIG. 8 above.

Upon occurrence of the next clock cycle, the method proceeds to steps 944, 946, described above.

Figure 9E:
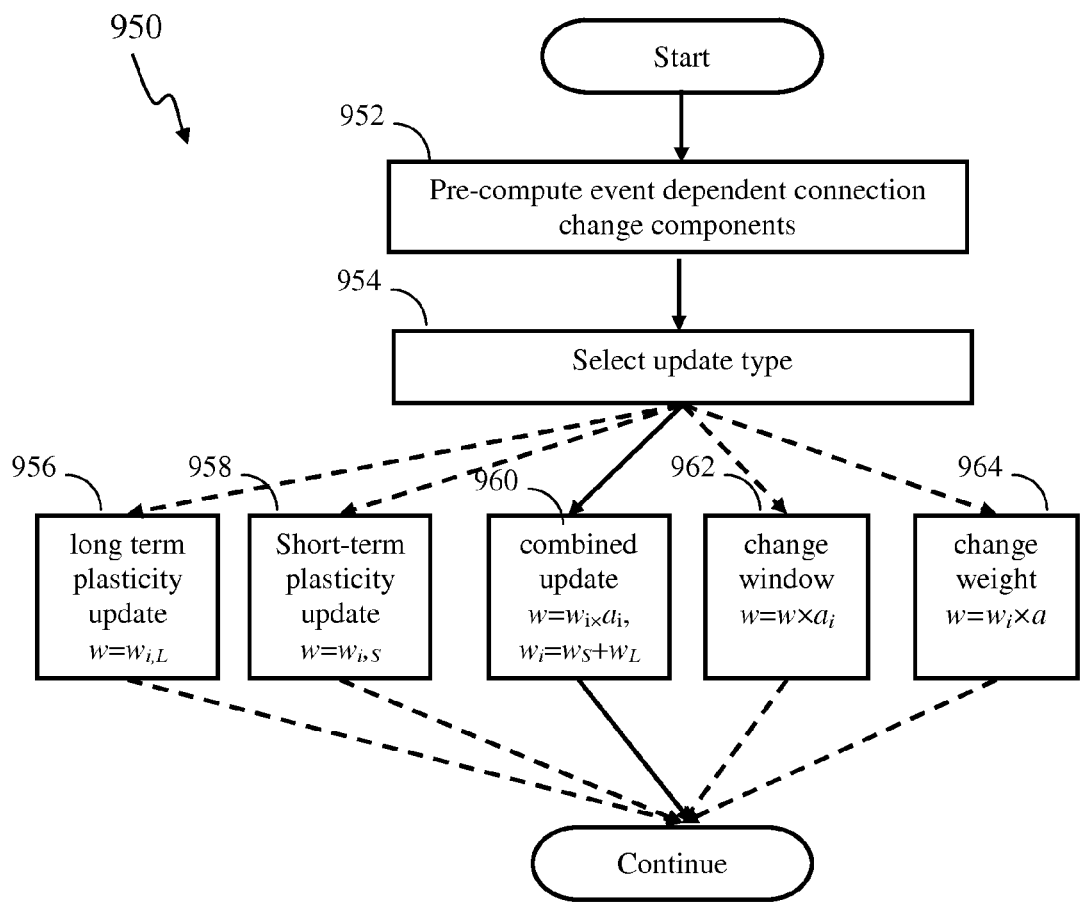
FIG. 9E is a logical flow diagram illustrating update selection method for use with efficient connection updates of FIGS. 9A-9D, in accordance with one or more implementations.

FIG. 9E illustrates update type selection method for use with efficient connection update methods illustrated in FIGS. 9A-9D, in accordance with one or more implementations.

At step 952 of method 950, the EDCC components may be computed using any of the methodologies described above with respect, for example, to FIGS. 6-8. In some implementations, a local or global look up table (e.g. Table 2) may be used in lieu of computing the components $y_m(t)$.

At step 954 type of the update may be selected. In one or more implementations the connection update may comprise connection plasticity adjustment W. In some implementations, the plasticity adjustment may comprise changing one or both the connection weight $w_i$, and plasticity window $\alpha_i$:

$$W = w_i \alpha_i.$$

In some implementations, the plasticity adjustment may comprise long term plasticity, effectuated by a long-term connection weight adjustment:

$$w_i = w_{i,L}.$$

In some implementations, the plasticity adjustment may comprise short term plasticity, effectuated by a short-term connection adjustment:

$$W = W_S.$$

In some implementations, the plasticity adjustment may comprise both the long term and the short-term plasticity adjustment:

$$W = W_L + W_S.$$

As used herein, the terms short-term, and long-term plasticity may be used to describe connection adjustments that may be configured to affect connection contribution to neuron dynamics over long term L and short term time scales S, respectively. In one or more implementations, the short term time scales S may correspond to the time scales associated with the present input into the network (e.g., the input 402 of the network 400 in FIG. 4). In one or more implementations, the long-term time scales L may correspond to the time scales associated with prior input into the network (e.g., the input that may have happened sometime in the past, prior to the input 402 of the network 400 in FIG. 4. In some or more implementations, the short-term time scales S may be selected between 1 ms and 1000 ms, while the long term times scales may be selected to extend from 1 s to days.

Exemplary Apparatus

Various exemplary spiking network apparatus comprising one or more of the methods set forth herein (e.g., using the efficient connection plasticity update mechanism explained above) are now described with respect to FIGS. 10-11D.

Adaptive Processing Apparatus

Figure 10:
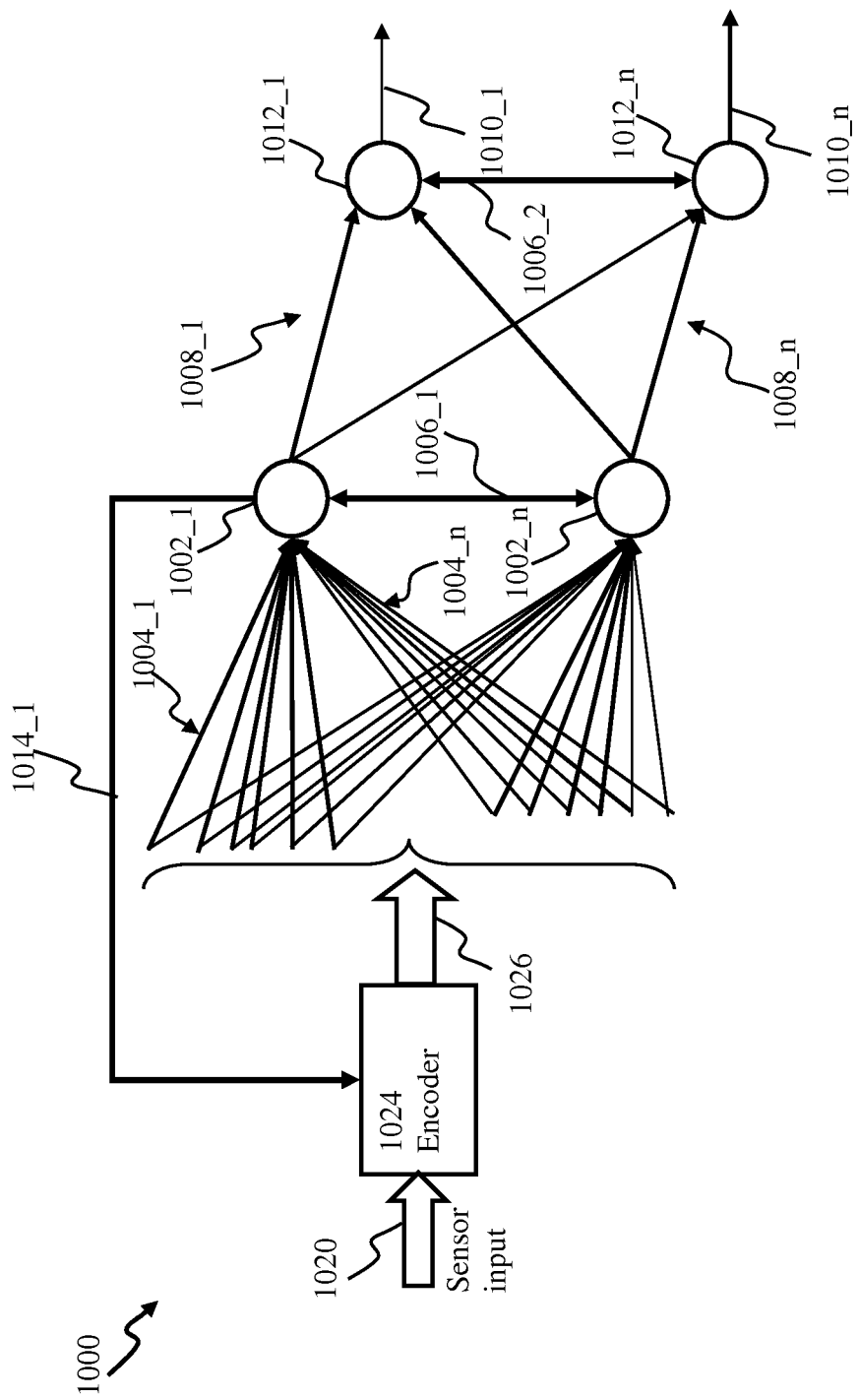
FIG. 10 is a block diagram illustrating sensory processing apparatus configured to implement efficient connection plasticity update mechanism in accordance with one or more implementations.

One apparatus for processing of sensory information (e.g., visual, audio, somatosensory) using spiking neural network comprising for example the efficient connection plasticity update mechanism is shown in FIG. 10. The illustrated processing apparatus 1000 may comprise an input interface configured to receive an input sensory signal 1020. In some implementations, this sensory input may comprise electromagnetic waves (e.g., visible light, IR, UV, etc.) entering an imaging sensor array (comprising RGCs, a charge coupled device (CCD), or an active-pixel sensor (APS)). The input signal in this case is a sequence of images (image frames) received from a CCD camera via a receiver apparatus, or downloaded from a file. Alternatively, the image is a two-dimensional matrix of RGB values refreshed at a 24 Hz frame rate. It will be appreciated by those skilled in the art that the above image parameters are merely exemplary, and many other image representations (e.g., bitmap, CMYK, grayscale, etc.) and/or frame rates are equally useful with the present invention.

The apparatus 1000 may comprise an encoder 1024 configured to transform (encodes) the input signal into an encoded signal 1026. In one implementation, the encoded signal may comprise a plurality of pulses (also referred to as a group of pulses) configured to model neuron behavior. The encoded signal 1026 may be communicated from the encoder 1024 via multiple connections (also referred to as transmission channels, communication channels, or synaptic connections) 1004 to one or more neuronal nodes (also referred to as the detectors) 1002.

In the implementation of FIG. 10, different detectors of the same hierarchical layer may be denoted by a "_n" designator, such that e.g., the designator 1002_1 denotes the first detector of the layer 1002. Although only two detectors (1002_1, 1002_n) are shown in the embodiment of FIG. 10 for clarity, it is appreciated that the encoder can be coupled to any number of detector nodes that is compatible with the detection apparatus hardware and software limitations. Furthermore, a single detector node may be coupled to any practical number of encoders.

In one embodiment, individual ones of the detectors 1002_1, 1002_n contain logic (which may be implemented as a software code, hardware logic, or a combination of thereof) configured to recognize a predetermined pattern of pulses in the encoded signal 1004, using for example any of the mechanisms described in U.S. patent application Ser. No. 12/869,573, filed Aug. 26, 2010 and entitled "SYSTEMS AND METHODS FOR INVARIANT PULSE LATENCY CODING", U.S. patent application Ser. No. 12/869,583, filed Aug. 26, 2010, entitled "INVARIANT PULSE LATENCY CODING SYSTEMS AND METHODS", U.S. patent application Ser. No. 13/117,048, filed May 26, 2011 and entitled "APPARATUS AND METHODS FOR POLYCHRONOUS ENCODING AND MULTIPLEXING IN NEURONAL PROSTHETIC DEVICES", U.S. patent application Ser. No. 13/152,084, filed Jun. 2, 2011, entitled "APPARATUS AND METHODS FOR PULSE-CODE INVARIANT OBJECT RECOGNITION", each incorporated herein by reference in its entirety, to produce post-synaptic detection signals transmitted over communication channels 1008. In FIG. 10, the designators 1008_1, 1008_n denote output of the detectors 1002_1, 1002_n, respectively.

In one implementation, the detection signals may be delivered to a next layer of the detectors 1012 (comprising detectors 1012_1, 1012_m, 1012_k) for recognition of complex object features and objects, similar to the exemplary implementation described in commonly owned and co-pending U.S. patent application Ser. No. 13/152,084, filed Jun. 2, 2011, entitled "APPARATUS AND METHODS FOR PULSE-CODE INVARIANT OBJECT RECOGNITION", incorporated herein by reference in its entirety. In this implementation, individual subsequent layers of detectors may be configured to receive signals from the previous detector layer, and to detect more complex features and objects (as compared to the features detected by the preceding detector layer). For example, a bank of edge detectors may be followed by a bank of bar detectors, followed by a bank of corner detectors and so on, thereby enabling alphabet recognition by the apparatus.

Individual ones of the detectors 1002 may output detection (post-synaptic) signals on communication channels 1008_1, 1008_n (with appropriate latency) that may propagate with different conduction delays to the detectors 1012. The detector cascade of the embodiment of FIG. 10 may contain any practical number of detector nodes and detector banks determined, inter alia, by the software/hardware resources of the detection apparatus and complexity of the objects being detected.

The sensory processing apparatus implementation illustrated in FIG. 10 may further comprise lateral connections 1006.

In some implementations, the apparatus 1000 may comprise feedback connections 1014, configured to communicate context information from detectors within one hierarchy layer to previous layers, as illustrated by the feedback connections 1014_1 in FIG. 10. In some implementations, the feedback connection 1014_2 may be configured to provide feedback to the encoder 1024 thereby facilitating sensory input encoding, as described in detail in commonly owned and co-pending U.S. patent application Ser. No. 13/152,084, filed Jun. 2, 2011, entitled "APPARATUS AND METHODS FOR PULSE-CODE INVARIANT OBJECT RECOGNITION", incorporated supra.

Computerized Neuromorphic System

Figure 11A:
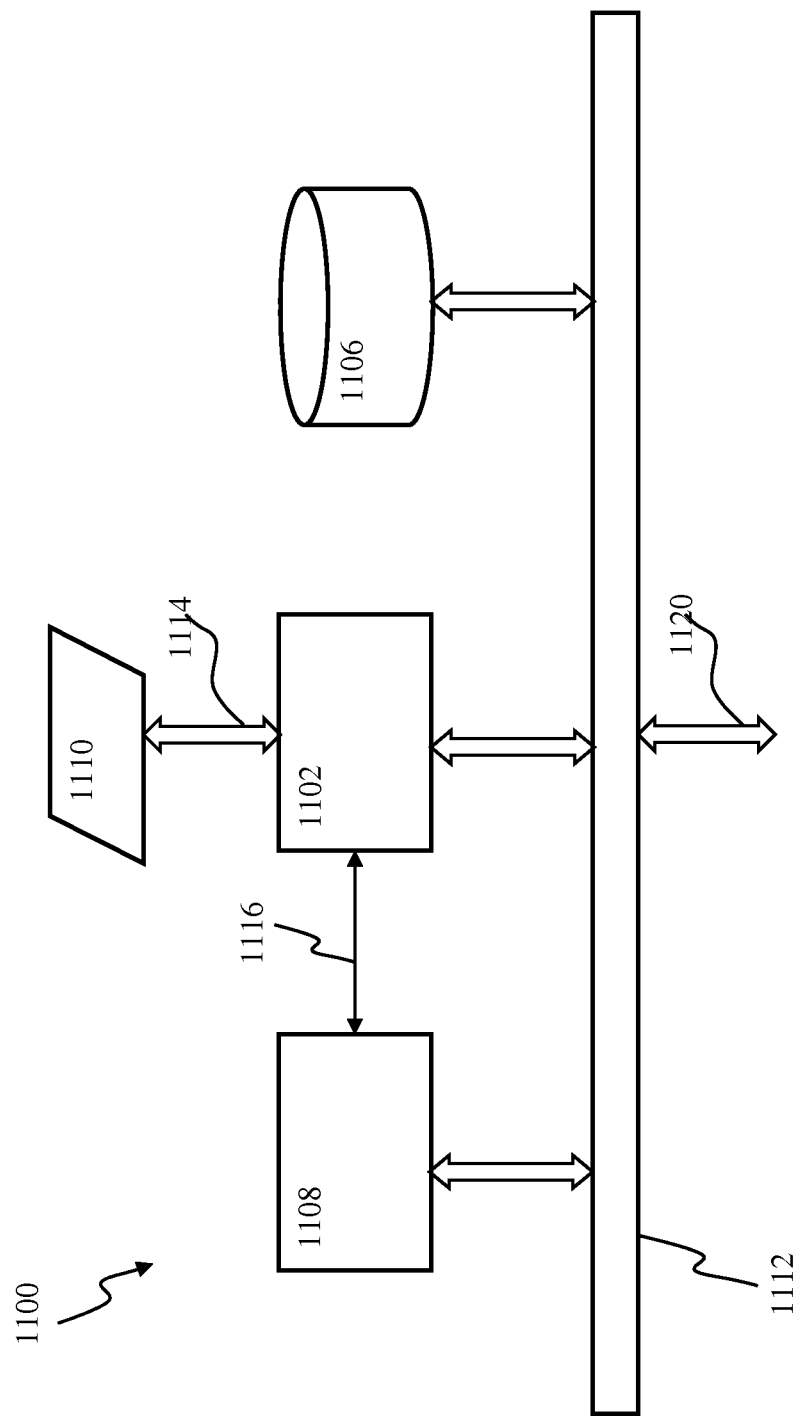
FIG. 11A is a block diagram illustrating computerized system useful for efficient connection plasticity update mechanism in a spiking network, in accordance with one or more implementations.

One particular implementation of the computerized neuromorphic processing system, for operating a computerized spiking network (and implementing the exemplary efficient connection plasticity update methodology described supra), is illustrated in FIG. 11A. The computerized system 1100 of FIG. 11A may comprise an input interface 1110, such as for example an image sensor, a computerized spiking retina, an audio array, a touch-sensitive input device, etc. The input interface 1110 may be coupled to the processing block (e.g., a single or multi-processor block) via the input communication interface 1114. The system 1100 may comprise a random access memory (RAM) 1108, configured to store neuronal states and connection parameters (e.g., weights 526 in FIG. 5), and to facilitate synaptic updates. In some implementations, synaptic updates may be performed according to the description provided in, for example, in U.S. patent application Ser. No. 13/239,255 filed Sep. 21, 2011, entitled "APPARATUS AND METHODS FOR SYNAPTIC UPDATE IN A PULSE-CODED NETWORK", incorporated by reference supra.

In some implementations, the memory 1108 may be coupled to the processor 1102 via a direct connection (memory bus) 1116. The memory 1108 may also be coupled to the processor 1102 via a high-speed processor bus 1112).

The system 1100 may further comprise a nonvolatile storage device 1106, comprising, inter alia, computer readable instructions configured to implement various aspects of spiking neuronal network operation (e.g., sensory input encoding, connection plasticity, operation model of neurons, etc.). in one or more implementations, the nonvolatile storage 1106 may be used to store state information of the neurons and connections when, for example, saving/loading network state snapshot, or implementing context switching (e.g., saving current network configuration (comprising, inter alia, connection weights and update rules, neuronal states and learning rules, etc.) for later use and loading previously stored network configuration.

In some implementations, the computerized apparatus 1100 may be coupled to one or more external processing/storage/input devices via an I/O interface 1120, such as a computer I/O bus (PCI-E), wired (e.g., Ethernet) or wireless (e.g., Wi-Fi) network connection.

In some implementations, the input/output interface may comprise a speech input (e.g., a microphone) and a speech recognition module configured to receive and recognize user commands.

It will be appreciated by those skilled in the arts that various processing devices may be used with computerized system 1100, including but not limited to, a single core/multicore CPU, DSP, FPGA, GPU, ASIC, combinations thereof, and/or other processors. Various user input/output interfaces may be similarly applicable to embodiments of the invention including, for example, an LCD/LED monitor, touch-screen input and display device, speech input device, stylus, light pen, trackball, end the likes.

Figure 11B:
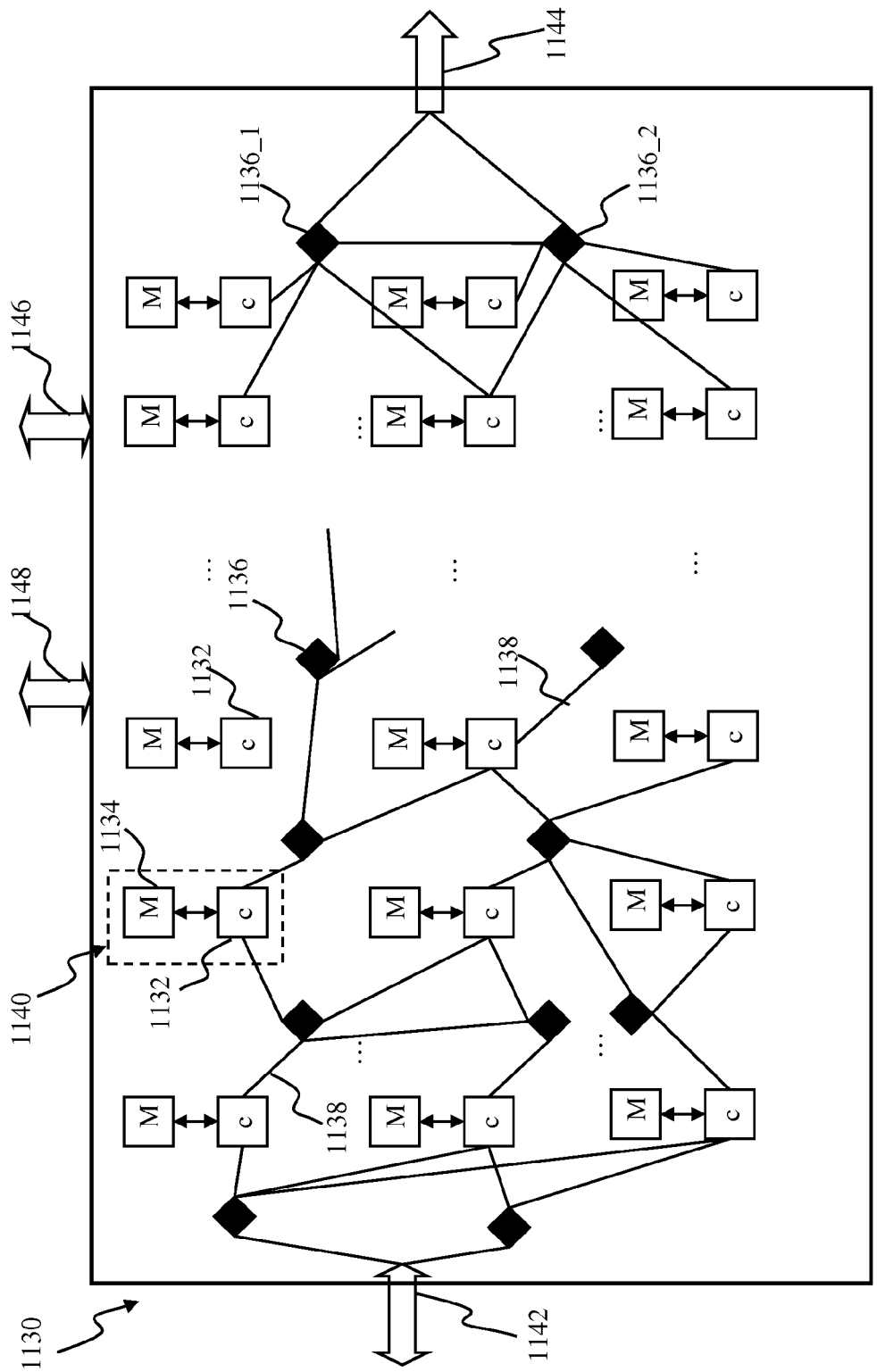
FIG. 11B is a block diagram illustrating a neuromorphic computerized system useful with efficient connection plasticity update mechanism in a spiking network, in accordance with one or more implementations.

Referring now to FIG. 11B, one implementation of neuromorphic computerized system configured to implement efficient connection plasticity update mechanism in a spiking network is described in detail. The neuromorphic processing system 1130 of FIG. 11B may comprises a plurality of processing blocks (micro-blocks) 1140 where individual micro cores may comprise a computing logic core 1132 and a memory block 1134. The logic core 1132 may be configured to implement various aspects of neuronal node operation, such as the node model, and synaptic update rules (e.g., the I-STDP) and/or other tasks relevant to network operation. The memory block may be configured to store, inter alia, neuronal state variables and connection parameters (e.g., weights, delays, I/O mapping) of connections 1138.

The micro-blocks 1140 may be interconnected with one another using connections 1138 and routers 1136. As it is appreciated by those skilled in the arts, the connection layout in FIG. 11B is exemplary, and many other connection implementations (e.g., one to all, all to all, etc.) are compatible with the disclosure.

The neuromorphic apparatus 1130 may be configured to receive input (e.g., visual input) via the interface 1142. In one or more implementations, applicable for example to interfacing with computerized spiking retina, or image array, the apparatus 1130 may provide feedback information via the interface 1142 to facilitate encoding of the input signal.

The neuromorphic apparatus 1130 may be configured to provide output (e.g., an indication of recognized object or a feature, or a motor command, e.g., to zoom/pan the image array) via the interface 1144.

The apparatus 1130, in one or more implementations, may interface to external fast response memory (e.g., RAM) via high bandwidth memory interface 1148, thereby enabling storage of intermediate network operational parameters (e.g., spike timing, etc.). The apparatus 1130 may also interface to external slower memory (e.g., Flash, or magnetic (hard drive)) via lower bandwidth memory interface 1146, in order to facilitate program loading, operational mode changes, and retargeting, where network node and connection information for a current task is saved for future use and flushed, and previously stored network configuration is loaded in its place.

Figure 11C:
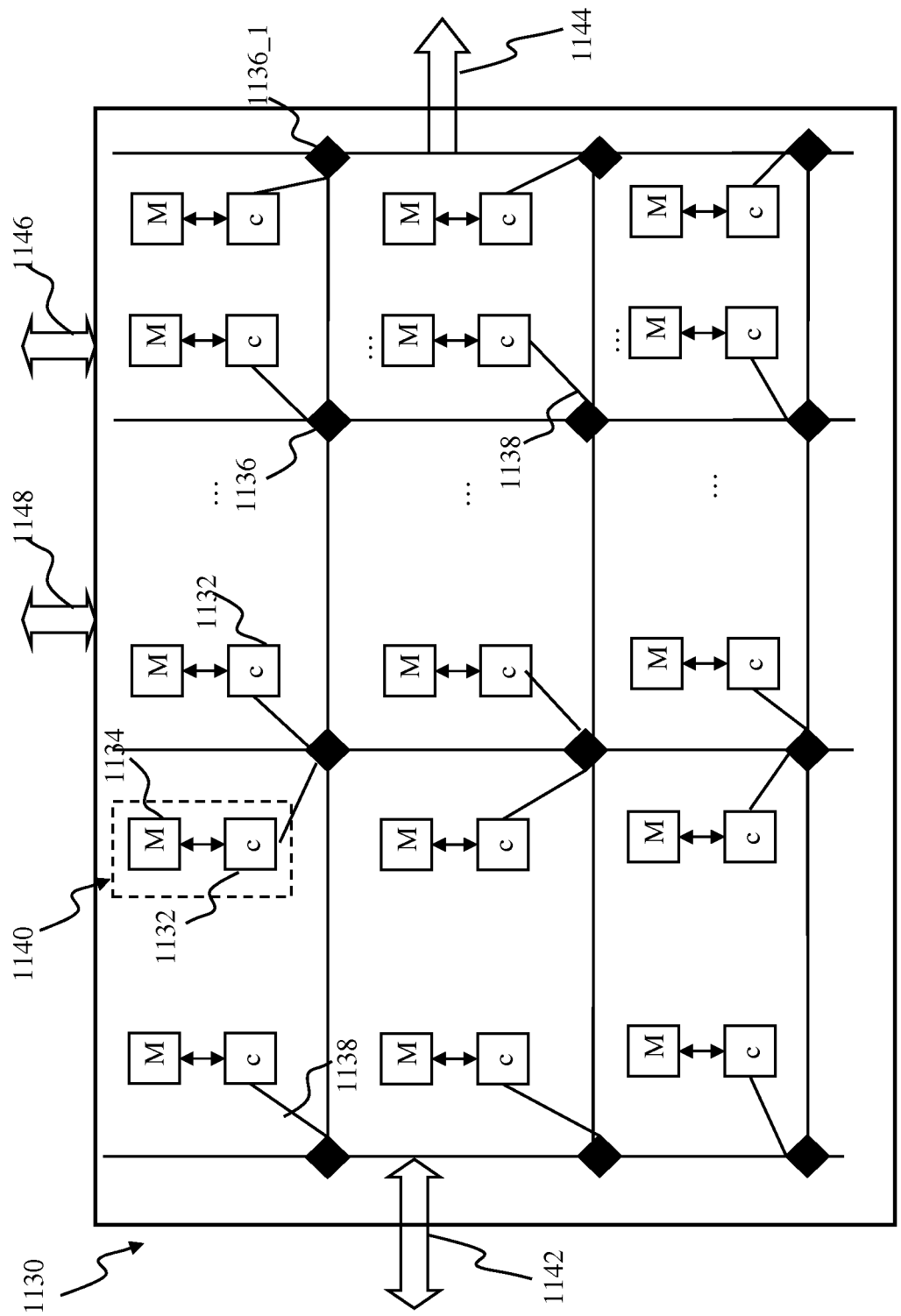
FIG. 11C is a block diagram illustrating a hierarchical neuromorphic computerized system architecture useful with efficient connection plasticity update mechanism in a spiking network, in accordance with one or more implementations.

FIG. 11C, illustrates one or more implementations of shared bus neuromorphic computerized system comprising micro-blocks, described with respect to FIG. 11B, supra. architecture coupled to a shared) 1140. The apparatus 1145 of FIG. 11C utilized one o (or more) shared bus 1146 in order to interconnect micro-blocks 1140 with one another.

Figure 11D:
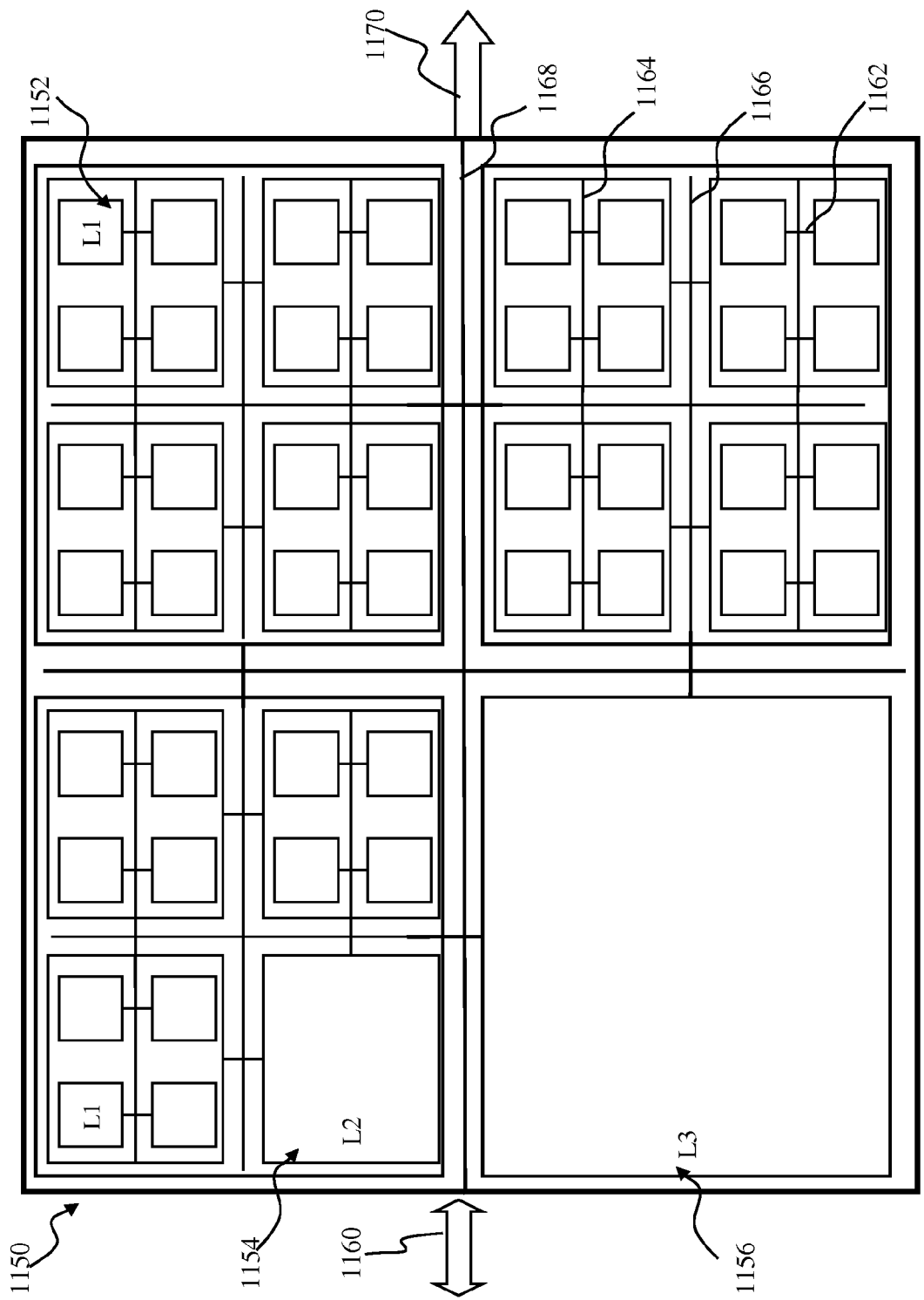
FIG. 11D is a block diagram illustrating cell-type neuromorphic computerized system architecture useful with efficient connection plasticity update mechanism in a spiking network, in accordance with one or more implementations.

FIG. 11D, illustrates one implementation of cell-based neuromorphic computerized system architecture configured to implement efficient connection plasticity update mechanism in a spiking network is described in detail. The neuromorphic system 1150 of FIG. may comprise a hierarchy of processing blocks (cells block). In some implementations, the lowest level L1 cell 1152 of the apparatus 1150 may comprise logic and memory and may be configured similar to the micro block 1140 of the apparatus shown in FIG. 11B. A number of cell blocks may be arranges in a cluster and communicate with one another a local interconnects 1162, 1164. Individual ones of such clusters may form higher level cell, e.g., cell L2, denoted as 1154 in FIG. 11d. Similarly several L2 clusters may communicate with one another via a second level interconnect 1166 and form a super-cluster L3, denoted as 1156 in FIG. 11D. The super-clusters 1154 may communicate via a third level interconnect 1168 and may form a next level cluster, and so on. It will be appreciated by those skilled in the arts that the hierarchical structure of the apparatus 1150, comprising four cells-per-level, is merely one exemplary implementation, and other implementations may comprise more or fewer cells per level, and/or fewer or more levels.

Different cell levels (e.g., L1, L2, L3) of the apparatus 1150 may be configured to perform functionality various levels of complexity. In one implementation, different L1 cells may process in parallel different portions of the visual input (e.g., encode different frame macro-blocks), with the L2, L3 cells performing progressively higher level functionality (e.g., edge detection, object detection). Different L2, L3, cells may also perform different aspects of operating, for example, a robot, with one or more L2/L3 cells processing visual data from a camera, and other L2/L3 cells operating motor control block for implementing lens motion what tracking an object or performing lens stabilization functions.

The neuromorphic apparatus 1150 may receive input (e.g., visual input) via the interface 1160. In one or more implementations, applicable for example to interfacing with computerized spiking retina, or image array, the apparatus 1150 may provide feedback information via the interface 1160 to facilitate encoding of the input signal.

The neuromorphic apparatus 1150 may provide output (e.g., an indication of recognized object or a feature, or a motor command, e.g., to zoom/pan the image array) via the interface 1170. In some implementations, the apparatus 1150 may perform all of the I/O functionality using single I/O block (not shown).

The apparatus 1150, in one or more implementations, may interface to external fast response memory (e.g., RAM) via high bandwidth memory interface (not shown), thereby enabling storage of intermediate network operational parameters (e.g., spike timing, etc.). In one or more implementations, the apparatus 1150 may also interface to external slower memory (e.g., flash, or magnetic (hard drive)) via lower bandwidth memory interface (not shown), in order to facilitate program loading, operational mode changes, and retargeting, where network node and connection information for a current task may be saved for future use and flushed, and previously stored network configuration may be loaded in its place.

Simulation Results

Figure 12:
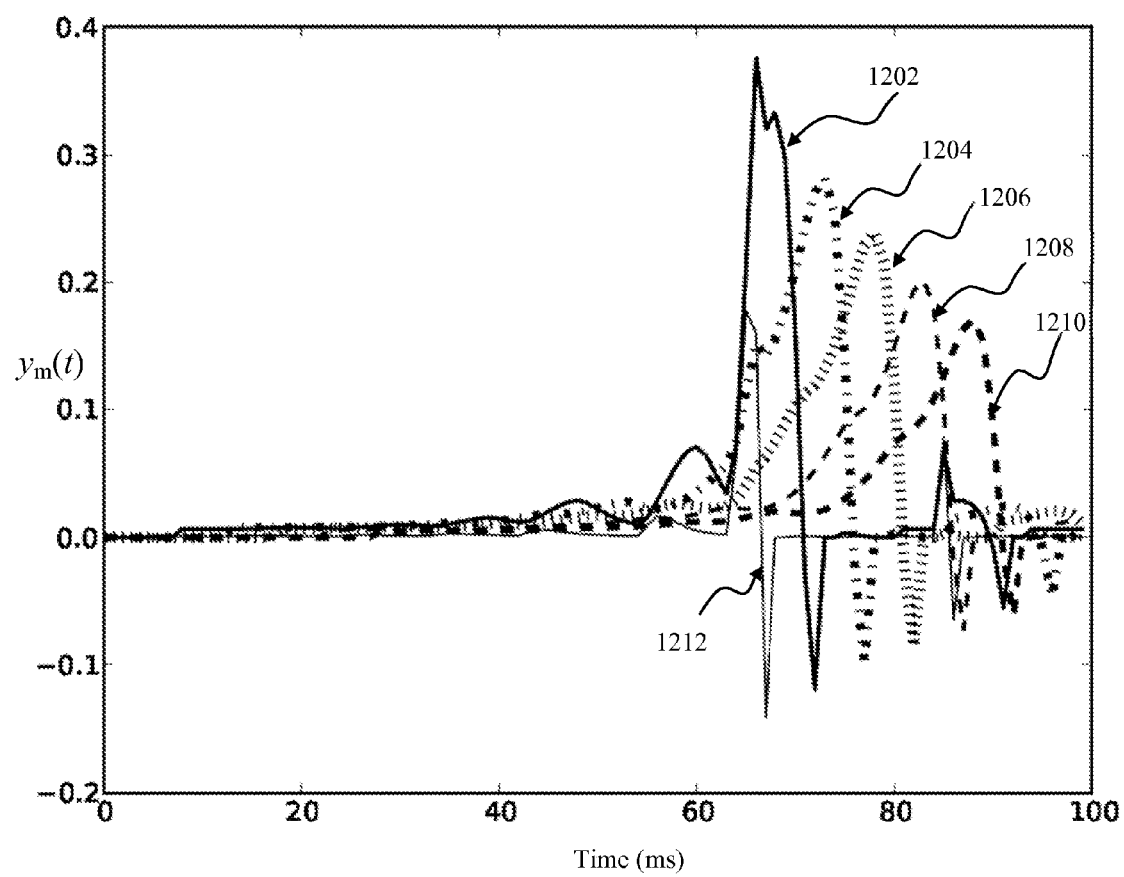
FIG. 12 is a plot illustrating event-dependent connection change components computed in accordance with one or more implementations.

FIG. 12 presents results obtained during simulation and testing by the Assignee hereof, of exemplary computerized spiking network apparatus configured to implement efficient connection update methodology described above. The exemplary apparatus, in one implementation, may comprise spiking neuronal network 400, described in detail with respect to FIG. 4, supra.

FIG. 12 illustrates the event-dependent connection change (EDCC) components computed for a neuron comprising M=100 connection. The connection state decay time scale T may be selected at 20 ms and the network was updated using synchronous cyclic updates at 1 ms intervals. The update process in this implementation may be configured using state-dependent eligibility traces of Eqn. 19, where the term Q(t) $S_i(t)$ may be configured using Eqn. 17.

The traces 1202, 1204, 1206, 1208, 1210, 1212 depict time evolution of EDCC components inside LUT that corresponds to float e variable described in the following HLND listing.

```
1.   DEFINE UNIT StochasticSRMNeuron
2.   {
3.   INIT
4.   {
5.   //Neuron state variable (v – voltage)
6.   float v = 0;
7.   float x1 = 0;
8.   //Stochastic part
9.   float lambda = 0;
10.  float Lambda_big = 0;
11.  float randgen = 0;
12.  float I = 0;
13.  int spiked = 0;
14.  float Q = 0;
15.  //Precalculated eligibility traces
16.  float syn_x[ ] = {0,0,0,...}; //30 zeros (T = 30 here)
17.  float syn_st[ ] = {0,0,0,...};
18.  float syn_e[ ] = {0,0,0,...};
19.  }
20.  UPDATE_RULE
21.  {
22.  CODE
23.  {
24.  //Update voltage
25.  v += –v*Consts.MembraneConstant +
     x1*Consts.MembraneConstant*2.71828183;
26.  x1 += –x1*Consts.MembraneConstant + I;
27.  I = 0;
28.  spiked = 0;
29.  //Probabilistic threshold calculations
30.  lambda = Consts.lambda0*Math.Exp((v –
     Consts.Threshold)*Consts.stochasticK);
31.  if (lambda < 0.2)
32.  Lambda_big = lambda;
33.  else
34.  Lambda_big = 1. – Math.Exp(–lambda);
35.  randgen = Sys.Rand(32,–31);
36.  if (randgen < Lambda_big)
37.  spiked = 1;
38.  //Reset voltage
39.  if (spiked)
40.  v = 0;
41.  if (spiked)
42.  x1 = 0;
43.  //Calculate state-dependent term Q(t) for eligibility
     traces
44.  Q = lambda*Consts.stochasticK;
45.  if (spiked)
46.  //TODO: implement with tables
47.  if (lambda<0.2)
48.  Q += (–Consts.stochasticK);
49.  else
50.  Q += (–Consts.stochasticK)*lambda/Lambda_big;
51.  // code added per neuron that implements LUTs
52.  for(int i = n–1; i >0; ––i)
53.  {
54.  syn_x[i] = syn_x[i–1] –syn_x[i–1]*membraneConstant;
55.  syn_st[i] = syn_st[i–1] –syn_st[i–1]*membraneConstant +
     syn_x[i–1]*membraneConstant*2.71828183;
56.  syn_e[i]= entropyDecayCoeff*syn_e[i–1] +
     stateDerivative*syn_st[i–1]*entropyAntiDecayTau;
57.  }
```

```
58.     syn_x[0] = 1;
59.     syn_st[0] = 0;
60.     syn_e[0] = syn_st[0]*stateDerivative;
61.     //Reset synapse state traces if there was an output spike
62.     if (spiked)}
63.         for(int i = n-1; i >= 0; --i)
64.         }
65.             syn_x[i] = 0;
66.             syn_st[i] = 0;
67.         }
68.     }
69.     }
70.     }
71.     EVENT_RULE
72.     {
73.     EXEC_CONDITION { spiked}
74.     CODE {
75.     }
76.     }
77.     }
78.     DEFINE SYNAPSE SRMStochasticSynapse
79.     {
80.     INIT
81.     {
82.     float w = Consts.initialW;
83.     int t_last_0 = -10000;
84.     int t_last_1 = -10000;
85.     int t_last_2 = -10000;
86.     int t_last_3 = -10000;
87.     }
88.     //Synapse doesn't have UPDATE RULE that is executed every
        time step - only event-based rules
89.     PRESYNAPTIC_EVENT_RULE
90.     {
91.     Unit.I += w;
92.     //Detect input spike times
93.     t_last_3 = t_last_2;
94.     t_last_2 = t_last_1;
95.     t_last_1 = t_last_0;
96.     t_last_0 = Sys.Now;
97.     }
98.     POSTSYNAPTIC_EVENT_RULE
99.     }
100.    float e = 0;
101.    //Access to look-up table in the neuron
102.    if (Sys.Now - t_last_0 < n)
103.    e += Unit.syn_e[Sys.Now - t_last_0];
104.    if (Sys.Now - t_last_1 < n)
105.    e += Unit.syn_e[Sys.Now - t_last_1];
106.    if (Sys.Now -t_last_2 < n)
107.    e += Unit.syn_e[Sys.Now - t_last_2];
108.    if (Sys.Now - t_last_3 < n)
109.    e += Unit.syn_e[Sys.Now - t_last_3];
110.    w -= Unit.total_reward*e;
111.    }
112.    }
```

Exemplary Uses and Applications of Certain Aspects of the Invention

Advantageously, the methodology described herein may provide substantial reduction in a number of computations that may be required in order to implement synaptic updates for a spiking neuron comprising many synaptic connection. The efficient update methodology of the disclosure requires C×nT operations and M×nT of memory locations in order to update all M synapses of a neuron, where nT may be typically in a range between 2 and 50. For a typical synapse density of between 100 and 10,000 per neuron, this may correspond to 5 to 500 time reduction in the number of computations, compared to the prior art. The number of computations required for synaptic updates may be reduced even further by implementing on demand updates and/or partitioning network operation into time-intervals where the synapse dynamics may be semi-stationary (time invariant) so that EDCC components may be computed once per segment.

Efficient update methodology may advantageously be traded for (i) reduction in cost, complexity, size and power consumption of a neuromorphic apparatus that is required to operate the network; and/or (ii) increase apparatus throughput thereby allowing for networks of higher synapse density.

In one or more implementations, the efficient update apparatus of the disclosure may be implemented as a software library configured to be executed by a computerized neural network apparatus (e.g., containing a digital processor). In some implementations, the generalized learning apparatus may comprise a specialized hardware module (e.g., an embedded processor or controller). In some implementations, the spiking network apparatus may be implemented in a specialized or general purpose integrated circuit (e.g., ASIC, FPGA, and/or PLD). Myriad other implementations may exist that will be recognized by those of ordinary skill given the present disclosure.

Advantageously, the present disclosure can be used to simplify and improve control tasks for a wide assortment of control applications including, without limitation, industrial control, adaptive signal processing, navigation, and robotics. Exemplary implementations of the present disclosure may be useful in a variety of devices including without limitation prosthetic devices (such as artificial limbs), industrial control, autonomous and robotic apparatus, HVAC, and other electro-mechanical devices requiring accurate stabilization, set-point control, trajectory tracking functionality or other types of control. Examples of such robotic devices may include manufacturing robots (e.g., automotive), military devices, and medical devices (e.g., for surgical robots). Examples of autonomous navigation may include rovers (e.g., for extraterrestrial, underwater, hazardous exploration environment), unmanned air vehicles, underwater vehicles, smart appliances (e.g., ROOMBA®), and/or robotic toys. The present disclosure can advantageously be used in all other applications of adaptive signal processing systems (comprising for example, artificial neural networks), including: machine vision, pattern detection and pattern recognition, object classification, signal filtering, data segmentation, data compression, data mining, optimization and scheduling, and/or complex mapping.

It will be recognized that while certain aspects of the disclosure are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed implementations, or the order of performance of two or more steps permuted. All such variations are considered to be encompassed within the disclosure disclosed and claimed herein.

While the above detailed description has shown, described, and pointed out novel features of the disclosure as applied to various implementations, it will be understood that various omissions, substitutions, and changes in the form and details of the device or process illustrated may be made by those skilled in the art without departing from the disclosure. The foregoing description is of the best mode presently contemplated of carrying out the invention. This description is in no way meant to be limiting, but rather should be taken as illustrative of the general principles of the invention. The scope of the disclosure should be determined with reference to the claims.

What is claimed:

1. A non-transitory computer-readable storage medium having instructions embodied thereon, the instructions being executable by a processor to perform a method for implementing an update of learning parameters of a plurality of connections of a spiking neuron, the method comprising:

operating the neuron in accordance with a process configured to be updated at time intervals;

storing a time history of one or more inputs provided to the neuron via the plurality of connections, the time history of a given input being descriptive of a time at which the given input occurs, the storing of the time history being performed within a time window comprising a plurality of the time intervals;

receiving an indication conveying whether the update is to be performed;

responsive to the indication, determining a plurality of input-dependent connection change components (IDCC), individual ones of the plurality of the IDCC components being associated with individual ones of the plurality of the time intervals, the plurality of IDCC components being based on the time of the indication and time of individual ones of the one or more inputs corresponding to individual ones of the plurality of the time intervals; and effectuating the update by adjusting the learning parameters, the adjustment determined based on the plurality of the IDCC components.

2. The non-transitory computer-readable storage medium of claim 1, wherein:

the update further comprises a determination of a plurality of eligibility traces, individual ones of the plurality of eligibility traces being associated with a given one of the plurality of connections and comprising a temporary record of occurrence of at least one of the one or more inputs on the given one of the plurality of connections; and the determination of the plurality of eligibility traces being effectuated based on an integration of respective ones of the plurality of IDCC components.

3. A computer-implemented method of operating a plurality of data interfaces in a computerized network, the method being performed by one or more processors configured to execute computer program modules, the method comprising:

storing a time record of one or more data items capable of being provided via the plurality of data interfaces, the time record of a given data item being descriptive of a time at which the given data item occurred;

based on an indication conveying whether an update is to be performed, updating a plurality of parameters, the plurality of parameters being associated with the plurality of data interfaces, the updating comprising:
reading previous values of the plurality of parameters;
determining updated values of the plurality of parameters; and
storing the updated values of the plurality of parameters;

wherein:
the determining updated values is based on at least a portion of the time record, the portion covering a time interval prior to the indication; and
the determining updated values comprises a number of operations that is proportional to number of the one or more data items, the number of operations being independent from a number of the plurality of data interfaces.

4. The method of claim 3, further comprising:
operating individual ones of the plurality of data interfaces in accordance with an interface dynamic process, the interface dynamic process being characterized by a dynamic state capable of being updated at time periods, the interface dynamic process being characterized by a decay interval;

wherein:
the time interval is configured to cover a period of at least a decay time window; and determine
the determining updated values further comprises obtaining, based on the indication and the time record, a plurality of interface change components, individual ones of the plurality interface change components being configured to characterize a change of individual ones of the plurality of parameters being effectuated at a time instance associated with the indication, due to the one or more data items occurring within the time interval window.

5. The method of claim 4, wherein:
the computerized network comprises spiking neuron network (SNN);
individual ones of the plurality of data interfaces comprise synaptic connections of the SNN;
individual ones of the plurality of parameters comprise a synaptic weight of respective synaptic connection, the weight;
is based at least on an occurrence of a data item of the one or more data items within the time interval; and
the decay time window comprises an exponential decay window characterized by a decrease of the weight by a factor of about 2.7 within a duration of the exponential decay window.

6. The method of claim 5, wherein:
the SNN is capable of implementing a learning process characterized by an external signal, the learning process configured to produce an outcome;
the update is capable of aiding the outcome being produced; and
the indication comprises at least a portion of the external signal.

7. The method of claim 4, wherein:
individual ones of the plurality of parameters comprise a connection delay associated with a respective one of the plurality of data interfaces; and
the plurality interface change components is capable of providing update of the plurality of data interfaces.

8. The method of claim 4, wherein:
the time period comprises a regular period of equal duration;
individual ones of the plurality interface change components are associated with a respective time period occurring an integer number of the durations prior to the indication time instance; and
one or more interface change components are determined based on a difference between (i) the respective time period, and (ii) the indication time instance.

9. The method of claim 8, wherein individual ones of the one or more interface change components are associated with at least one data item of the one or more data items occurring within the respective time period.

10. The method of claim 4, wherein the indication is based on one or both of (i) an occurrence of a data item of one or more data items or (ii) a timer event indicative of an expiration of current update time period.

11. A neural network system configured to reduce a computational load for operating a plurality of communication interfaces of a network node, the system comprising:
one or more processors configured to execute one or more computer program modules to perform one or more operations comprising:

operate the node in accordance with a node dynamic process being capable of being updated at time intervals; and based on an indication conveying whether an update is to be performed:

reduce the computational load by effectuating an update of a plurality of parameters associated with the plurality of communication interfaces, the update being based on one or more data items being communicated via at least one of the plurality of communication interfaces prior to the indication;

wherein the update of the plurality of parameters comprises a number of operations, the number of operations being independent from a number of the plurality of communication interfaces.

12. The system of claim 11, wherein the indication is based on an output being generated by the spiking neuron.

13. The system of claim 11, wherein individual ones of the plurality of data interfaces are capable of being operated in accordance with a linear interface dynamic process characterized by a stable equilibrium having a decay time scale associated therewith.

14. The system of claim 13, wherein:

individual ones of the plurality of parameters comprise a weight, the weight being capable of modifying a state of the node based on an occurrence of a data item of the one or more data items within the decay time scale; and the update is based on one or more of:

(1) a decomposition of an interface state associated with the linear interface dynamic process into a plurality of stereotypical components;

(2) a determination of individual ones of the plurality of stereotypical components based on a time difference between occurrence of the indication and occurrence of the one or more data items; or (3) a linear combination of the plurality of stereotypical components, the linear combination being determined based on a value of individual ones of the plurality of stereotypical components corresponding to a time of the occurrence of the one or more data items, the value being discounted in accordance with the decay time scale and the time difference.

15. The system of claim 13, wherein execution of individual ones of the one or more computer program modules causes the one or more processors to store a time-history conveying when the one or more data items were provided within a time window via the plurality of communication interfaces, the time window being equal or longer the decay time scale.

16. The system of claim 14, wherein:

the number of the stereotypical components is selected between 2 and 40, inclusive; and the number of the plurality of communication interfaces is selected between 41 and 100000, inclusive.

17. The system of claim 14, wherein the update of the plurality of parameters comprises determining a plurality of interface change components based on the indication and the time-history, individual ones of the plurality interface change components being configured to characterize a change of the state being effectuated at an indication time instance associated with the indication responsive to the one or more data items occurring within an exponential decay window prior to the indication time instance.

18. The system of claim 17, wherein:

the linear interface dynamic process is capable of being periodically updated at a time interval;

the exponential decay window comprising two or more of the time intervals;

the determining of the plurality of interface change components is effectuated via a look-up table, the look-up table comprising two or more entries associated with the two or more of the time intervals; and individual ones of the plurality of interface change components are configured independent of the state of the node to enable determination of the look-up table prior to a first occurrence of the time interval to alleviate the determination of the look-up table for individual ones of the updates.

19. The system of claim 17, wherein:

the linear interface dynamic process is capable of being periodically updated at a time interval;

the exponential decay window comprising two or more the time intervals;

the determining of the plurality of interface change components is effectuated via a look-up table comprising two or more entries associated with the two or more of the time intervals;

individual ones of the a plurality of interface change components are configured based on the state of the node; and the look-up table is determined for two or more of the updates.

20. The system of claim 14, wherein:

the update comprises an on-demand update; and the indication comprises a buffer event associated with the storing of the time-history.

21. The system of claim 11, wherein:

the node state update characterized by a cyclic update effectuated at a regular time interval; and the indication comprises a timer event associated with the regular time interval.

22. The system of claim 14, wherein:

the node state update comprises a cyclic update effectuated at regular time interval; and the indication is based on the data item of the one or more data items communicated via at least one of the plurality of communication interfaces.

23. The system of claim 22, wherein the update is delayed until a next regular time interval occurring subsequent to occurrence of the data item of the one or more data items.

24. The system of claim 11, wherein:

the node dynamic process comprises a reinforcement learning process configured to produce an outcome;

the update of the plurality of parameters is capable of aiding the outcome being produced; and the indication comprises a reinforcement spike generated based on an evaluation of node output versus the outcome.

* * * * *